US012331379B2

(12) United States Patent
Nishio et al.

(10) Patent No.: US 12,331,379 B2
(45) Date of Patent: Jun. 17, 2025

(54) COLD-ROLLED STEEL SHEET AND MANUFACTURING METHOD THEREOF

(71) Applicant: NIPPON STEEL CORPORATION, Tokyo (JP)

(72) Inventors: Takuya Nishio, Tokyo (JP); Masafumi Azuma, Tokyo (JP); Yoshimasa Narita, Tokyo (JP); Shintaro Okura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/273,884

(22) PCT Filed: Mar. 1, 2022

(86) PCT No.: PCT/JP2022/008567
§ 371 (c)(1),
(2) Date: Jul. 24, 2023

(87) PCT Pub. No.: WO2022/190958
PCT Pub. Date: Sep. 15, 2022

(65) Prior Publication Data
US 2024/0309482 A1    Sep. 19, 2024

(30) Foreign Application Priority Data

Mar. 10, 2021  (JP) ................ 2021-038717

(51) Int. Cl.
*C21D 6/00* (2006.01)
*B32B 15/01* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 1/18* (2013.01); *C21D 1/19* (2013.01); *C21D 1/25* (2013.01); *C21D 1/26* (2013.01); *C21D 1/74* (2013.01); *C21D 1/76* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0242* (2013.01); *C21D 8/0263* (2013.01); *C21D 8/0273* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01);
(Continued)

(58) Field of Classification Search
CPC ... C22C 38/001; C22C 38/002; C22C 38/005; C22C 38/02; C22C 38/04; C22C 38/06; C22C 38/12; C22C 38/14; C22C 38/16; C22C 38/18; C22C 38/20; C22C 38/22; C22C 38/24; C22C 38/26; C22C 38/28; C22C 38/32; C22C 38/38; C22C 38/40; C22C 38/42; C22C 38/44; C22C 38/46; C22C 38/48; C22C 38/50; C22C 38/54; C22C 38/58; C23C 2/022; C23C 2/0224; C23C 2/06; C23C 2/28; C23C 2/285; C23C 2/29; C23C 2/40; C23C 28/025; C23C 30/00; C23C 30/005; B32B 15/013; B32B 15/04; B32B 15/043; B32B 15/18; Y10T 428/12799; Y10T 428/12951; Y10T 428/12972; C21D 2211/001; C21D 2211/002; C21D 2211/005; C21D 2211/008; C21D 1/18; C21D 1/19; C21D 1/25; C21D 1/26; C21D 1/74; C21D 1/76; C21D 9/46; C21D 6/001; C21D 6/002; C21D 6/005; C21D 6/008; C21D 8/0205; C21D 8/0226; C21D 8/0236; C21D 8/0242; C21D 8/0263; C21D 8/2073

See application file for complete search history.

(56) References Cited

U.S. PATENT DOCUMENTS

| 2008/0000555 A1 | 1/2008 | Nonaka et al. |
| 2018/0298462 A1 | 10/2018 | Sano et al. |
| 2021/0062288 A1 | 3/2021 | Nishio et al. |

FOREIGN PATENT DOCUMENTS

| JP | 2006-104532 A | 4/2006 |
| JP | 2009-30091 A | 2/2009 |

(Continued)

*Primary Examiner* — Michael E. La Villa
(74) *Attorney, Agent, or Firm* — Birch, Stewart, Kolasch & Birch, LLP

(57) ABSTRACT

This cold-rolled steel sheet has a predetermined chemical composition, in which a metallographic structure of a t/4 portion, which is at a ¼ position of a sheet thickness t from a surface of the cold-rolled steel sheet in a sheet thickness direction has a predetermined structure, and in both an edge portion, which is an end portion of the cold-rolled steel sheet, and a center portion of the cold-rolled steel sheet, in the width direction, a metallographic structure of a 20 μm portion, which is at a position 20 μm from the surface in the sheet thickness direction, includes, by volume percentage, ferrite and bainite: 75.0% or more and 100.0% or less in total, and a metallographic structure of a 75 μm portion, includes ferrite and bainite: 0.0% or more and 15.0% or less in total.

18 Claims, No Drawings

(51) Int. Cl.
| | |
|---|---|
| *B32B 15/04* | (2006.01) |
| *B32B 15/18* | (2006.01) |
| *C21D 1/18* | (2006.01) |
| *C21D 1/19* | (2006.01) |
| *C21D 1/25* | (2006.01) |
| *C21D 1/26* | (2006.01) |
| *C21D 1/74* | (2006.01) |
| *C21D 1/76* | (2006.01) |
| *C21D 8/02* | (2006.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/38* | (2006.01) |
| *C22C 38/40* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C23C 2/02* | (2006.01) |
| *C23C 2/06* | (2006.01) |
| *C23C 2/28* | (2006.01) |
| *C23C 2/40* | (2006.01) |
| *C23C 28/02* | (2006.01) |
| *C23C 30/00* | (2006.01) |

(52) U.S. Cl.
CPC .............. *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/022* (2022.08); *C23C 2/0224* (2022.08); *C23C 2/06* (2013.01); *C23C 2/28* (2013.01); *C23C 2/285* (2013.01); *C23C 2/29* (2022.08); *C23C 2/40* (2013.01); *C23C 28/025* (2013.01); *C23C 30/00* (2013.01); *C23C 30/005* (2013.01); C21D 2211/001 (2013.01); C21D 2211/002 (2013.01); C21D 2211/005 (2013.01); C21D 2211/008 (2013.01); Y10T 428/12799 (2015.01); Y10T 428/12951 (2015.01); Y10T 428/12972 (2015.01)

(56) References Cited

FOREIGN PATENT DOCUMENTS

| | | |
|---|---|---|
| JP | 2010-215958 A | 9/2010 |
| JP | 6187710 B2 | 8/2017 |
| JP | 6635236 B1 | 1/2020 |
| WO | 2019/181950 A1 * | 9/2019 |

* cited by examiner

COLD-ROLLED STEEL SHEET AND MANUFACTURING METHOD THEREOF

TECHNICAL FIELD OF THE INVENTION

The present invention relates to a cold-rolled steel sheet and a manufacturing method thereof.

Priority is claimed on Japanese Patent Application No. 2021-038717, filed Mar. 10, 2021, the content of which is incorporated herein by reference.

RELATED ART

Today, as industrial technology fields are highly divided, materials used in each technology field require special and advanced performance. In particular, with regard to steel sheets for a vehicle, in order to reduce a weight of a vehicle body and improve fuel efficiency in consideration of the global environment, there is a significantly increasing demand for cold rolled high tensile strength steel sheets having a small sheet thickness and excellent formability. Among the steel sheets for a vehicle, particularly for cold-rolled steel sheets used for vehicle body frame components, high strength is required, and furthermore, high formability for wide applications is required. Examples of properties required for a steel sheet for a vehicle include a tensile strength (TS) of 1,400 MPa or more and a uniform elongation of 5.0% or more. Further, depending on a processing method and an applied component, it is also required that a limit bend radius R (R/t) standardized by a sheet thickness t in 90° V-bending is 5.0 or less.

Although it is effective to provide a structure containing ferrite in order to secure ductility such as uniform elongation, a secondary phase needs to be hardened to obtain a strength of 1.400 MPa or more with the structure containing ferrite. However, a hard secondary phase deteriorates bendability.

On the other hand, as a technique for achieving high strength, a steel sheet containing tempered martensite as a primary phase has been proposed (refer to, for example, Patent Documents 1 and 2). In Patent Documents 1 and 2, it is described that excellent bendability is achieved by providing a structure having a single phase of tempered martensite as a microstructure, and excellent hydrogen embrittlement resistance is achieved by providing a structure in which carbides, which are hydrogen trapping sites, are finely dispersed.

In addition, Patent Document 3 proposes a steel sheet using a TRIP effect caused by retained austenite as a technique for achieving both high-strengthening and high formability.

Furthermore, Patent Document 4 discloses a hot-dip galvannealed steel sheet having excellent uniform deformability (uniform elongation) and local deformability (local elongation) while having a tensile strength as high as 1,470 MPa or more.

However, the steel sheet of Patent Document 1 has a tensile strength as low as less than 1,400 MPa. Therefore, in a case of aiming for further high-strengthening, it is necessary to further improve workability, bendability, and hydrogen embrittlement resistance that deteriorate with high-strengthening.

In addition, although the steel sheet of Patent Document 2 can achieve a strength as high as 1,400 MPa or more, since the steel sheet is cooled to near room temperature during cooling during quenching, there is a problem in that a volume percentage of retained austenite is small and high uniform elongation cannot be obtained.

In addition, since the steel sheet of Patent Document 3 has ferrite, it is difficult to obtain a strength as high as 1,400 MPa or more, and a strength difference in the structure causes deterioration in bendability.

In addition, Patent Document 4 does not consider hydrogen embrittlement resistance.

As an invention for solving these technical problems, Patent Document 5 discloses a cold-rolled steel sheet capable of achieving both formability and hydrogen embrittlement resistance, which are problems in a high strength steel sheet, at a high level by allowing a metallographic structure at a ¼ position of a sheet thickness from a surface of the cold-rolled steel sheet, which is a representative position of the steel sheet, to be a structure primarily containing tempered martensite while containing retained austenite, and softening a surface layer and refining a hard phase in a surface layer area through dew point control during annealing.

PRIOR ART DOCUMENT

Patent Document

[Patent Document 1] Japanese Unexamined Patent Application, First Publication No. 2009-30091
[Patent Document 2] Japanese Unexamined Patent Application, First Publication No. 2010-215958
[Patent Document 3] Japanese Unexamined Patent Application, First Publication No. 2006-104532
[Patent Document 4] Japanese Patent No. 6187710
[Patent Document 5] Japanese Patent No. 6635236

DISCLOSURE OF THE INVENTION

Problems to be Solved by the Invention

However, as a result of repeated examinations by the present inventors, it was found that in a high strength steel having a tensile strength of 1,400 MPa or more, in a case where a soft layer of a surface layer is thick, when a steel sheet is processed into a component to form a component, a proof stress of the component (applicable component proof stress) may not increase with the strength of the steel sheet. That is, it was found that even if a steel sheet is high-strengthened, there are cases where a design load as a component is not increased.

The present invention has been made to solve such problems and provides a cold-rolled steel sheet having high strength, and excellent formability and applicable component proof stress, and a manufacturing method thereof.

Means for Solving the Problem

The present inventors examined a method to obtain a sufficient component proof stress while improving bendability in a cold-rolled steel sheet having a metallographic structure primarily containing tempered martensite, with which high strength and excellent hydrogen embrittlement resistance can be obtained.

As a result, it was found that in a case where a proportion of a relatively soft structure is increased to reduce hardness at a position 20 μm away from a surface of a steel sheet in a sheet thickness direction and a structure equivalent to that of an inside of the steel sheet is formed at a position 75 μm away from the surface in the sheet thickness direction by adjusting a dew point and heat treatment conditions in the manufacturing process, particularly during annealing, a decrease in component proof stress can be suppressed while improving bendability.

The present invention has been made in view of the above findings. The gist of the present invention is as follows.

[1] A cold-rolled steel sheet according to an aspect of the present invention includes, as a chemical composition, by mass %: C: 0.180% or more and 0.350% or less; Mn: 2.00% or more and 4.00% or less; P: 0% or more and 0.100% or less; S: 0% or more and 0.010% or less; Al: 0% or more and 0.100% or less; N: 0% or more and 0.0100% or less; Si: 0% or more and 1.00% or less; Ti: 0% or more and 0.050% or less; Nb: 0% or more and 0.050% or less; V: 0% or more and 0.50% or less; Cu: 0% or more and 1.00% or less; Ni: 0% or more and 1.00% or less; Cr: 0% or more and 1.00% or less; Mo: 0% or more and 0.50% or less; B: 0% or more and 0.0100% or less; Ca: 0% or more and 0.010% or less; Mg: 0% or more and 0.0100% or less; REM: 0% or more and 0.0500% or less; Bi: 0% or more and 0.050% or less; and a remainder of Fe and impurities, in which a metallographic structure of a t/4 portion, which is at a ¼ position of a sheet thickness t from a surface of the cold-rolled steel sheet in a sheet thickness direction, includes, by volume percentage, retained austenite: 2.0% or more and 8.0% or less, tempered martensite: 80.0% or more and 98.0% or less, ferrite and bainite: 0.0% or more and 15.0% or less in total, and martensite: 0.0% or more and 5.0% or less, and in both an edge portion, which is at a position 50 mm away from an end portion of the cold-rolled steel sheet in a width direction, and a center portion of the cold-rolled steel sheet in the width direction, a metallographic structure of a 20 μm portion, which is at a position 20 μm away from the surface in the sheet thickness direction, includes, by volume percentage, ferrite and bainite: 75.0% or more and 100.0% or less in total, and martensite and tempered martensite: 0.0% or more and 25.0% or less in total, an average grain size of the martensite and the tempered martensite in the metallographic structure of the 20 μm portion is 5.0 μm or less, and a metallographic structure of a 75 μm portion, which is at a position 75 μm away from the surface in the sheet thickness direction, includes, by volume percentage, ferrite and bainite: 0.0% or more and 15.0% or less in total.

[2] The cold-rolled steel sheet according to [1] may include, as the chemical composition, by mass %, one or two or more selected from the group consisting of: Si: 0.005% or more and 1.00% or less; Ti: 0.001% or more and 0.050% or less; Nb: 0.001% or more and 0.050% or less; V: 0.01% or more and 0.50% or less; Cu: 0.01% or more and 1.00% or less; Ni: 0.01% or more and 1.00% or less; Cr: 0.01% or more and 1.00% or less; Mo: 0.01% or more and 0.50% or less; B: 0.0001% or more and 0.0100% or less; Ca: 0.0001% or more and 0.010% or less; Mg: 0.0001% or more and 0.0100% or less; REM: 0.0005% or more and 0.0500% or less; and Bi: 0.0005% or more and 0.050% or less.

[3] In the cold-rolled steel sheet according to [1] or [2], a tensile strength may be 1,400 MPa or more, a uniform elongation may be 5.0% or more, and R/t, which is a value obtained by dividing a limit bend radius R in 90° V-bending by the sheet thickness t, may be 5.0 or less.

[4] In the cold-rolled steel sheet according to any one of [1] to [3], a hot-dip galvanized layer may be formed on the surface.

[5] In the cold-rolled steel sheet according to [4], the hot-dip galvanized layer may be a hot-dip galvannealed layer.

[6] A manufacturing method of a cold-rolled steel sheet according to another aspect of the present invention, includes: a hot rolling process of heating, as necessary, a cast slab containing, as a chemical composition, by mass %, C: 0.180% or more and 0.350% or less, Mn: 2.00% or more and 4.00% or less, P: 0% or more and 0.100% or less. S: 0% or more and 0.010% or less, Al: 0% or more and 0.100% or less, N: 0% or more and 0.0100% or less, Si: 0% or more and 1.00% or less, Ti: 0% or more and 0.050% or less. Nb: 0% or more and 0.050% or less, V: 0% or more and 0.50% or less, Cu: 0% or more and 1.00% or less, Ni: 0% or more and 1.00% or less, Cr: 0% or more and 1.00% or less. Mo: 0% or more and 0.50% or less, B: 0% or more and 0.0100% or less, Ca: 0% or more and 0.010% or less, Mg: 0% or more and 0.0100% or less, REM: 0% or more and 0.0500% or less, Bi: 0% or more and 0.050% or less, and a remainder of Fe and impurities, and performing hot rolling on the cast slab to obtain a hot-rolled steel sheet; a coiling process of cooling the hot-rolled steel sheet to a coiling temperature of 550° C. or lower and coiling the hot-rolled steel sheet at the coiling temperature; a cold rolling process of pickling the hot-rolled steel sheet and performing cold rolling on the hot-rolled steel sheet to obtain a cold-rolled steel sheet; an annealing process of heating the cold-rolled steel sheet after the cold rolling process to a soaking temperature of 820° C. or higher in a nitrogen-hydrogen mixed atmosphere having a dew point of −20° C. or higher and 20° C. or lower and containing 1.0 volume % or more and 20 volume % or less of hydrogen as an in-furnace atmosphere during heating so that an average heating rate from 700° C. to the soaking temperature is slower than 10.0° C./sec. and annealing the cold-rolled steel sheet at the soaking temperature for 30 seconds or longer and 200 seconds or shorter; a first cooling process of cooling the cold-rolled steel sheet after the annealing process to a temperature range of higher than 425° C. and lower than 600° C.; a holding process of allowing the cold-rolled steel sheet to stay in the temperature range of higher than 425° C. and lower than 600° C. for 200 seconds or longer and 750 seconds or shorter after the first cooling process; a second cooling process of cooling the cold-rolled steel sheet to a temperature of 50° C. or higher and 250° C. or lower after the holding process; a tempering process of tempering the cold-rolled steel sheet at a temperature of 200° C. or higher and 350° C. or lower for 1 second or longer after the second cooling process; a third cooling process of cooling the cold-rolled steel sheet to a temperature at which skin pass rolling is possible after the tempering process; and a skin pass process of performing skin pass rolling on the cold-rolled steel sheet after the third cooling process, in which a temperature of the hot-rolled steel sheet is caused to reach 500° C. or lower within 10 hours from completion of the hot rolling process.

[7] In the manufacturing method of a cold-rolled steel sheet according to [6], the cast slab may contain, as the chemical composition, by mass %, one or two or more selected from the group consisting of: Si: 0.005% or more and 1.00% or less, Ti: 0.001% or more and 0.050% or less. Nb: 0.001% or more and 0.050% or less. V: 0.01% or more and 0.50% or less, Cu: 0.01% or more and 1.00% or less, Ni: 0.01% or more and 1.00% or less. Cr: 0.01% or more and 1.00% or less, Mo: 0.01% or more and 0.50% or less, B: 0.0001% or more and 0.0100% or less, Ca: 0.0001% or more and 0.010% or less, Mg: 0.0001% or more and 0.0100% or less. REM: 0.0005% or more and 0.0500% or less, and Bi: 0.0005% or more and 0.050% or less.

[8] In the manufacturing method of a cold-rolled steel sheet according to [6] or [7], in the holding process, the cold-rolled steel sheet may be immersed in a plating bath in a state where a temperature of the cold-rolled steel sheet is higher than 425° C. and lower than 600° C. to form a hot-dip galvanized layer on a surface of the cold-rolled steel sheet.

[9] In the manufacturing method of a cold-rolled steel sheet according to [8], an alloying treatment for alloying the hot-dip galvanized layer may be performed in the holding process.

Effects of the Invention

According to the above aspects of the present invention, it is possible to provide a cold-rolled steel sheet having high strength, and excellent formability and applicable component proof stress, and a manufacturing method thereof.

EMBODIMENTS OF THE INVENTION

A cold-rolled steel sheet according to an embodiment of the present invention (a cold-rolled steel sheet according to the present embodiment) and a manufacturing method thereof will be described.

The cold-rolled steel sheet according to the present embodiment has (a) a predetermined chemical composition, in which (b) each metallographic structure of a t/4 portion, which is at a ¼ position of a sheet thickness t from a surface of the cold-rolled steel sheet in a sheet thickness direction is controlled to a predetermined range, and (c) in both an edge portion, which is at a position 50 mm away from an end portion of the cold-rolled steel sheet in a width direction, and a center portion of the cold-rolled steel sheet in the width direction, a metallographic structure of each of a 20 μm portion, which is at a position 20 μm away from the surface in the sheet thickness direction, and a 75 μm portion, which is at a position 75 μm away from the surface in the sheet thickness direction, is controlled to a predetermined range.

The cold-rolled steel sheet according to the present embodiment includes not only a cold-rolled steel sheet having no plating layer on the surface, but also a hot-dip galvanized steel sheet having a hot-dip galvanized layer on the surface or a hot-dip galvannealed steel sheet having a hot-dip galvannealed layer on the surface, and these main conditions are common to the hot-dip galvanized steel sheet and the hot-dip galvannealed steel sheet.

However, in a case of a plated steel sheet, a surface as a reference indicating a position defining a metallographic structure means a surface of a base steel sheet excluding plating.

Each will be described below.

<Chemical Composition>

First, the chemical composition of the cold-rolled steel sheet according to the present embodiment will be described. Hereinafter, "%" indicating an amount of each element in the chemical composition means "mass %" unless otherwise specified.

C: 0.180% or More and 0.350% or Less

When a C content is less than 0.180%, it becomes difficult to obtain the above-described metallographic structure, and a desired tensile strength cannot be achieved. In addition, a ratio (R/t) of a limit bend radius R to the sheet thickness t in 90° V-bending deteriorates. Therefore, the C content is set to 0.180% or more. The C content is preferably more than 0.180% and more preferably 0.200% or more.

On the other hand, when the C content is more than 0.350%, weldability deteriorates and bendability deteriorates. In addition, hydrogen embrittlement resistance also deteriorates. Therefore, the C content is set to 0.350% or less. The C content is preferably less than 0.350%, and more preferably 0.300% or less.

Mn: 2.00% or More and 4.00% or Less

Mn has an action of improving hardenability of steel and is an effective element for obtaining a desired metallographic structure described below. When a Mn content is less than 2.00%, it becomes difficult to obtain a desired metallographic structure. In this case, a sufficient tensile strength cannot be obtained. Therefore, the Mn content is set to 2.00% or more. The Mn content is preferably more than 2.00%, more preferably 2.20% or more, and even more preferably 2.40% or more.

On the other hand, when the Mn content is more than 4.00%, an effect of improving the hardenability is diminished due to segregation of Mn, and a material cost increases. Therefore, the Mn content is set to 4.00% or less. The Mn content is preferably less than 4.00%, more preferably 3.50% or less, and even more preferably 3.25% or less.

P: 0% or More and 0.100% or Less

P is an element contained in steel as an impurity and is an element that segregates at grain boundaries and embrittles steel. Therefore, a P content is preferably as small as possible and may be 0%. However, in consideration of a time and a cost for removing P, the P content is set to 0.100% or less. The P content is preferably 0.020% or less, and more preferably 0.015% or less. The P content may be set to 0.005% or more in consideration of a refining cost or the like.

S: 0% or More and 0.010% or Less

S is an element contained in steel as an impurity and is an element that forms sulfide-based inclusions and deteriorates the bendability. Therefore, a S content is preferably as small as possible and may be 0%. However, in consideration of a time and a cost for removing S, the S content is set to 0.010% or less. The S content is preferably 0.005% or less, more preferably 0.003% or less, and even more preferably 0.001% or less. The S content may be set to 0.0001% or more in consideration of the refining cost or the like.

Al: 0% or More and 0.100% or Less

Al is an element having an action of deoxidizing molten steel. In a case where Al is contained for the purpose of deoxidation, an Al content is preferably 0.005% or more, and more preferably 0.010% or more in order to reliably achieve the deoxidation. In addition, Al has an action of enhancing stability of austenite like Si and is an effective element for obtaining the above-described metallographic structure. Therefore, Al may be contained. In a case where Al is contained, the Al content may be, for example, 0.010% or more.

On the other hand, when the Al content is too high, not only are surface defects caused by alumina likely to occur, but also a transformation point significantly increases, so that a volume percentage of ferrite increases. In this case, it becomes difficult to obtain the above-mentioned metallographic structure, and a sufficient tensile strength cannot be obtained. Therefore, the Al content is set to 0.100% or less. The Al content is preferably 0.050% or less, more preferably 0.040% or less, and even more preferably 0.030% or less. In the cold-rolled steel sheet according to the present embodiment, Al does not necessarily have to be contained, and the Al content may be 0%.

N: 0% or More and 0.0100% or Less

N is an element that can be contained in steel as an impurity and is an element that forms coarse precipitates and deteriorates the bendability. Therefore, a N content is set to 0.0100% or less. The N content is preferably 0.0060% or less, and more preferably 0.0050% or less. The N content is preferably as small as possible, and may be 0%. The N content may be set to 0.0010% or more or 0.0020% or more in consideration of the refining cost or the like.

The cold-rolled steel sheet according to the present embodiment contains the above-mentioned elements and a remainder being Fe and impurities, and may further contain one or two or more of elements listed below that affect strength and the bendability as optional elements. However, since the optional elements do not necessarily have to be contained, lower limits of all thereof are 0%.

Si: 0% or More and 1.00% or Less

Si is an element useful for increasing the strength of the steel sheet by solid solution strengthening. In addition, Si suppresses the generation of cementite, and is thus an element effective in promoting the concentration of C in austenite and useful for generating retained austenite after annealing. Therefore, Si may be contained. In order to sufficiently obtain the above effect, a Si content is preferably set to 0.005% or more. When the Si content is 0.005% or more, uniform elongation can be sufficiently obtained, and excellent hydrogen embrittlement resistance can be obtained. The Si content is more preferably 0.01% or more. 0.03% or more. 0.05% or more. 0.10% or more, or 0.30% or more.

On the other hand, when the Si content is more than 1.00%, austenitic transformation during annealing heating slows down, and there are cases where transformation from ferrite to austenite does not occur sufficiently. In this case, an excessive amount of ferrite remains in the structure after annealing, and a target tensile strength cannot be achieved. In addition, there are cases where the bendability deteriorates, surface properties of the steel sheet deteriorate, or chemical convertibility and platability significantly deteriorate. Therefore, the Si content is set to 1.00% or less. The Si content is preferably less than 1.00% and more preferably 0.90% or less or 0.85% or less.

Ti: 0% or More and 0.050% or Less
Nb: 0% or More and 0.050% or Less
V: 0% or More and 0.50% or Less
Cu: 0% or More and 1.00% or Less Ti, Nb, V, and Cu are elements having an action of improving the strength of the steel sheet by precipitation hardening. Therefore, these elements may be contained. In order to sufficiently obtain the above effects, it is preferable that a Ti content and a Nb content are each set to 0.001% or more, and a V content and a Cu content are each set to 0.01% or more. The Ti content and the Nb content are each more preferably 0.005% or more, and the V content and the Cu content are each more preferably 0.05% or more. It is not essential to obtain the above effects. Therefore, it is not necessary to particularly limit lower limits of the Ti content, the Nb content, the V content, and the Cu content, and the lower limits thereof are 0%.

On the other hand, when these elements are excessively contained, a recrystallization temperature rises, the metallographic structure of the cold-rolled steel sheet becomes non-uniform, and the bendability is impaired. Therefore, in a case where these elements are contained, the Ti content is set to 0.050% or less, the Nb content is set to 0.050% or less, the V content is set to 0.50% or less, and the Cu content is set to 1.00% or less. The Ti content is preferably less than 0.050%, more preferably 0.030% or less, and even more preferably 0.020% or less. The Nb content is preferably less than 0.050%, more preferably 0.030% or less, and even more preferably 0.020% or less. The V content is preferably 0.30% or less. The Cu content is preferably 0.50% or less.

Ni: 0% or More and 1.00% or Less
Cr: 0% or More and 1.00% or Less
Mo: 0% or More and 0.50% or Less
B: 0% or More and 0.0100% or Less Ni, Cr, Mo, and B are elements that improve the hardenability and contribute to high-strengthening of the steel sheet, and are effective elements for obtaining the above-described metallographic structure. Therefore, these elements may be contained. In order to sufficiently obtain the above effects, it is preferable that a Ni content, a Cr content, and a Mo content are each set to 0.01% or more, and/or a B content is set to 0.0001% or more. More preferably, the Ni content, the Cr content, and the Mo content are each 0.05% or more, and the B content is 0.0010% or more. It is not essential to obtain the above effects. Therefore, it is not necessary to particularly limit lower limits of the Ni content, the Cr content, the Mo content, and the B content, and the lower limits thereof are 0%.

On the other hand, even if these elements are excessively contained, the effect of the above-described action is saturated, which is uneconomical. Therefore, in a case where these elements are contained, the Ni content and the Cr content are set to 1.00% or less, the Mo content is set to 0.50% or less, and the B content is set to 0.0100% or less. The Ni content and Cr content are preferably 0.50% or less, the Mo content is preferably 0.20% or less, and the B content is preferably 0.0030% or less.

Ca: 0% or More and 0.010% or Less
Mg: 0% or More and 0.0100% or Less
REM: 0% or More and 0.0500% or Less
Bi: 0% or More and 0.050% or Less Ca, Mg, and REM are elements having an action of improving the strength and bendability of the steel sheet by adjusting shapes of inclusions. Bi is an element having an action of improving the strength and bendability by refining a solidification structure. Therefore, these elements may be contained. In order to sufficiently obtain the above effects, it is preferable that a Ca content is set to 0.0001% or more, a Mg content is set to 0.0001% or more, and a REM content and a Bi content are each set to 0.0005% or more. More preferably, the Ca content is 0.0008% or more or 0.0010% or more, the Mg content is 0.0008% or more, and the REM content and the Bi content are each 0.0007% or more. It is not essential to obtain the above effects. Therefore, it is not necessary to particularly limit lower limits of the Ca content, the Mg content, the Bi content, and the REM content, and the lower limits thereof are 0%.

On the other hand, even if these elements are excessively contained, the effect of the above action is saturated, which is uneconomical. Therefore, in a case where these elements are contained, the Ca content is set to 0.010% or less, the Mg content is set to 0.0100% or less, the REM content is set to 0.0500% or less, and the Bi content is set to 0.050% or less. Preferably, the Ca content is 0.009% or less or 0.002% or less, the Mg content is 0.0020% or less, the REM content is 0.0020% or less, and the Bi content is 0.010% or less. REM means rare earth elements and is a generic term for a total of 17 elements of Sc, Y and lanthanides, and the REM content is a total amount of these elements.

<Metallographic Structure at ¼ Position (t/4 Portion) of Sheet Thickness t from Surface in Sheet Thickness Direction>

In a description of the metallographic structure of the cold-rolled steel sheet according to the present embodiment, microstructural fractions are indicated by volume percentages. Therefore, unless otherwise specified. "%" indicates "volume %".

[Retained Austenite: 2.0% or More and 8.0% or Less]

Retained austenite improves ductility of the steel sheet by a TRIP effect and contributes to an improvement in uniform elongation. Therefore, a volume percentage of retained austenite is set to 2.0% or more. The volume percentage of the retained austenite is preferably more than 2.0%, more preferably 2.5% or more, and even more preferably 3.5% or more.

On the other hand, when the volume percentage of the retained austenite becomes excessive, a grain size of retained austenite increases. Such retained austenite having a large grain size becomes coarse and hard martensite after deformation. In this case, the origin of cracks is likely to occur, and the bendability deteriorates. Therefore, the volume percentage of retained austenite is set to 8.0% or less. The volume percentage of the retained austenite is preferably less than 8.0%, more preferably 7.0% or less, and even more preferably 6.0% or less.

[Tempered Martensite: 80.0% or More and 98.0% or Less]

Tempered martensite is an aggregate of lath-shaped grains similar to martensite (so-called fresh martensite). On the other hand, unlike martensite, tempered martensite is a hard microstructure containing fine iron-based carbides inside as a result of tempering. Tempered martensite is obtained by tempering martensite generated by cooling or the like after annealing by a heat treatment or the like.

Tempered martensite is a microstructure that is not brittle and has ductility compared to martensite. In the cold-rolled steel sheet according to the present embodiment, a volume percentage of tempered martensite is set to 80.0% or more in order to improve the strength, bendability, and hydrogen embrittlement resistance. The volume percentage of tempered martensite is preferably 85.0% or more. In order to set the volume percentage of retained austenite to 2.0% or more, the volume percentage of tempered martensite is 98.0% or less.

[Ferrite and Bainite: 0.0% or More and 15.0% or Less in Total]

Ferrite is a soft phase obtained by performing two-phase annealing or performing slow cooling after annealing. In a case where ferrite is mixed with a hard phase such as martensite, the ductility of the steel sheet is improved. However, in order to achieve a strength as high as 1,400 MPa or more, it is necessary to limit the volume percentage of ferrite.

Bainite is a phase obtained by performing holding at 350° C. or higher and 450° C. or lower for a certain period of time after annealing. Bainite is softer than martensite and has an effect of improving the ductility. However, in order to achieve a strength as high as 1,400 MPa or more, it is necessary to limit a volume percentage of bainite as in the case of ferrite described above.

Therefore, the volume percentages of ferrite and bainite are set to 15.0% or less in total. The volume percentages of ferrite and bainite are preferably 10.0% or less. Since ferrite and bainite may not be contained, lower limits thereof are each 0.0%.

In addition, since ferrite is softer than bainite, in a case where a total volume percentage of ferrite and bainite is 15.0% or less, the volume percentage of ferrite is preferably less than 10.0% in order to achieve a strength as high as 1,400 MPa or more.

[Marchtensite: 0.0% or More and 5.0% or Less]

Martensite (fresh martensite) is an aggregate of lath-shaped grains that may be generated by transformation from austenite during final cooling after a tempering step. Since martensite is hard and brittle and tends to be an origin of cracking during deformation, a large volume percentage of martensite causes the deterioration in the bendability. Therefore, the volume percentage of martensite is set to 5.0% or less. The volume percentage of martensite is preferably 3.0% or less, and more preferably 2.0% or less. Since martensite may not be contained, a lower limit of the volume percentage of martensite is 0.0%.

The metallographic structure at the ¼ position (t/4 portion) of the sheet thickness t from the surface in the sheet thickness direction may contain pearlite as the remainder in the microstructure in addition to the above. However, pearlite is a microstructure having cementite in the microstructure and consumes C (carbon) in steel that contributes to an improvement in strength. When a volume percentage of pearlite is 5.0% or less, the strength of the steel sheet is increased. Therefore, the volume percentage of pearlite is preferably set to 5.0% or less. The volume percentage of pearlite is preferably 3.0% or less, and more preferably 1.0% or less.

The volume percentages in the microstructure of the t/4 portion of the cold-rolled steel sheet according to the present embodiment are measured as follows.

That is, the volume percentages of ferrite, bainite, martensite, tempered martensite, and pearlite are measured by a method in which, a test piece is collected from a certain position in a rolling direction of the steel sheet at a center position in the width direction, a longitudinal section (that is, a cross section parallel to the rolling direction and parallel to the thickness direction) parallel to the rolling direction is polished, and a metallographic structure that is revealed by nital etching at the ¼ position of the sheet thickness t from the surface in the sheet thickness direction is observed using a scanning electron microscope (SEM). In the SEM observation, five visual fields of 30 μm in the sheet thickness direction and 50 μm in the rolling direction are observed at a magnification of 3,000-fold so that the ¼ position of the sheet thickness t from the surface in the sheet thickness direction is at the center. An area ratio of each microstructure is measured from the observed image, and an average value thereof is calculated. Since there is no microstructural change in a direction (steel sheet width direction) perpendicular to the rolling direction and area ratios of the longitudinal section parallel to the rolling direction are equal to volume percentages, the area ratios obtained by the microstructural observation are each used as volume percentages.

In the measurement of the area ratio of each microstructure, a region with no substructure revealed and a low luminance is defined as ferrite. In addition, a region that is a layered structure of ferrite and cementite is defined as pearlite. In addition, a region with no substructure revealed and a high luminance is defined as martensite or retained austenite. In addition, a region in which a substructure is revealed is defined as tempered martensite or bainite.

Bainite and tempered martensite can be distinguished from each other by further carefully observing carbides in grains.

Specifically, tempered martensite includes martensite laths and cementite generated within the laths. Here, since there are two or more kinds of crystal orientation relationships between martensite laths and cementite, cementite included in the tempered martensite has a plurality of variants. On the other hand, bainite is classified into upper bainite and lower bainite. Upper bainite includes lath-shaped bainitic ferrite and cementite generated at the interface between the laths and can be easily distinguished from tempered martensite. Lower bainite includes lath-shaped bainitic ferrite and cementite generated within the laths. Here, there is one kind of crystal orientation relationship between bainitic ferrite and cementite unlike tempered martensite, and cementite included in lower bainite has the single variant. Therefore, lower bainite and tempered martensite can be distinguished from each other on the basis of the variants of cementite.

On the other hand, martensite and retained austenite cannot be clearly distinguished from each other by the SEM observation. Therefore, the volume percentage of martensite is calculated by subtracting the volume percentage of retained austenite calculated by a method described later from a volume percentage of a microstructure determined to be martensite or retained austenite.

The volume percentage of retained austenite is obtained by collecting a test piece from a certain position in the rolling direction of the steel sheet at a center position in the width direction, chemically polishing a rolled surface from the surface of the steel sheet to the ¼ position of the sheet thickness, and quantifying integrated intensities of (200) and (210) planes of ferrite and (200), (220), and (311) planes of austenite by MoKα radiation.

In the cold-rolled steel sheet according to the present embodiment, in both the edge portion, which is at a position 50 mm away from the end portion in the width direction, and the center portion in the width direction, the metallographic structure at a position (20 μm portion) 20 μm away from the surface in the sheet thickness direction and the metallographic structure at a position (75 μm portion) 75 μm away from the surface in the sheet thickness direction are controlled as follows.

<Metallographic Structure at Position (20 μm Portion) 20 μm Away from Surface in Sheet Thickness Direction>

The metallographic structure of the 20 μm portion, which is at a position 20 μm away from the surface in the sheet thickness direction, includes, by volume percentage, ferrite and bainite: 75.0% or more and 100.0% or less in total, and martensite and tempered martensite: 0.0% or more and 25.0% or less in total, and an average grain size of martensite and tempered martensite is 5.0 μm or less.

By causing a surface layer to primarily contain ferrite and bainite, which are softer than tempered martensite or the like, the bendability is improved. Therefore, the total volume percentage of ferrite and bainite is set to 75.0% or more. The total volume percentage of ferrite and bainite is preferably 77.0% or more, and more preferably 80.0% or more. On the other hand, an upper limit of the total volume percentage of ferrite and bainite may be set to 100.0%.

In addition, hard martensite or tempered martensite in the microstructure of the surface layer area not only hardens the surface layer area but also increases the origin of cracks, resulting in the deterioration in the bendability and hydrogen embrittlement resistance. That is, martensite and tempered martensite in the microstructure of the surface layer area need to have a small volume percentage and be fine. Therefore, in the 20 μm portion, the total volume percentage of martensite and tempered martensite is set to 25.0% or less, and the average grain size of martensite and tempered martensite is set to 5.0 μm or less. The total volume percentage of martensite and tempered martensite is preferably 22.0% or less, and more preferably 20.0% or less. Since martensite and tempered martensite may not be included, a lower limit of the total volume percentage thereof may be set to 0.0%.

The average grain size of martensite and tempered martensite is preferably 4.5 μm or less. On the other hand, although a lower limit of the average grain size of martensite and tempered martensite is not specified, the average grain size thereof may be set to 0.1 μm or more or 0.5 μm or more.

A remainder in the metallographic structure of 20 μm portion may contain retained austenite and pearlite. A total volume percentage of retained austenite and pearlite is preferably 3.0% or less.

<Metallographic Structure at Position (75 μm Portion) 75 μm Away from Surface in Sheet Thickness Direction>

The metallographic structure of the 75 μm portion which is at a position 75 μm away from the surface in the sheet thickness direction includes, by volume percentage, ferrite and bainite: 0.0% or more and 15.0% or less in total.

By increasing a proportion of a soft microstructure in the surface layer and decreasing a hardness, the bendability is improved. However, when a layer (soft layer) including a large amount of the soft microstructure increases in thickness from the surface, there are cases where a proof stress as a component (component proof stress) after the steel sheet is processed into a component decreases even though the strength of the steel sheet itself does not decrease.

As a result of an examination by the present inventors, it was found that even in a case where the surface layer (for example, the 20 μm portion described above) primarily includes a soft microstructure, the component proof stress is not reduced when the 75 μm portion has a microstructure equivalent to that of the inside (for example, t/4 portion) of the steel sheet (that is, the soft microstructure is small).

Therefore, in the cold-rolled steel sheet according to the present embodiment, the total volume percentage of ferrite and bainite is set to 15.0% or less in the metallographic structure of the 75 μm portion. The total volume percentage of ferrite and bainite is preferably 10.0% or less. On the other hand, since ferrite and bainite may not be contained, a lower limit of the total volume percentage thereof may be set to 0.0%.

Even at a position (60 μm portion) 60 μm away from the surface in the sheet thickness direction, the total volume percentage of ferrite and bainite is preferably 0.0% or more and 15.0% or less.

In the metallographic structure in the 75 μm portion, a remainder may include retained austenite, tempered martensite, and martensite, and may include, for example, retained austenite: 2.0% or more and 8.0% or less, tempered martensite: 80.0% or more and 98.0% or less, and martensite: 0.0% or more and 5.0% or less.

In the related art, as described in Patent Document 4 described above, formation of a soft layer in which an average fraction of a hard microstructure, which is a microstructure other than ferrite and pearlite, is 0.9 times that of a region from a ¼ thickness position to a ½ thickness position, in a surface layer has been considered in some cases. However, soft layer in the surface layer of Patent Document 4 does not focus on the total volume percentage of ferrite and bainite, and is different in idea from a relationship between the metallographic structures of the 20 μm portion and the 75 μm portion of the cold-rolled steel sheet according to the present embodiment.

The volume percentages of ferrite, bainite, martensite, tempered martensite, and pearlite in the metallographic structures of the 20 μm portion, the 60 μm portion, and the 75 μm portion are measured by a method in which, a test piece is collected from each of a center position in the width direction and a position 50 mm away from the end portion in the width direction at a certain position in the rolling direction of the steel sheet, a longitudinal section of each test piece parallel to the rolling direction is polished, and metallographic structures that are revealed by nital etching at a position 20 μm (a region of a range of 5 to 35 μm from the surface×50 μm in the rolling direction), at a position 60 μm (a region of a range of 45 to 75 μm from the surface×50 μm in the rolling direction), and at a position 75 μm (a region of a range of 60 to 90 μm from the surface×50 μm in the rolling direction) away from the surface in the sheet thickness direction are observed using SEM in the same manner as the observation of the t/4 portion.

In addition, the volume percentage of retained austenite in the metallographic structures of the 20 μm portion and the 75 μm portion is obtained by collecting a test piece from each of a center position in the width direction and a position 50 mm away from the end portion in the width direction at a certain position in the rolling direction of the steel sheet, chemically polishing a rolled surface from the surface of the steel sheet to the position of 20 μm or 75 μm, and quantifying integrated intensities of (200) and (210) planes of ferrite and (200), (220), and (311) planes of austenite by MoKα radiation.

The average grain size of martensite and tempered martensite in the 20 μm portion is obtained by the following method.

A test piece is collected from each of a center position in the width direction and a position 50 mm away from the end portion in the width direction at a certain position in the rolling direction of the steel sheet, a longitudinal section of each test piece parallel to the rolling direction is polished, and a metallographic structure that is revealed by nital etching at a position 20 μm away from the surface of the steel sheet in the sheet thickness direction is observed using SEM. For this microstructure, a circle equivalent average diameter of the microstructure determined to be martensite or tempered martensite described above is calculated by the intercept method described in JIS G 0551 (2013), and used as the average grain size of martensite and tempered martensite.

In the cold-rolled steel sheet according to the present embodiment, not only in the center portion in the width direction as described above, but also in the edge portion 50 mm away from the end portion in the width direction, the metallographic structures of the 20 μm portion and the 75 μm portion have the volume percentage and the average grain size of each phase described above.

In this case, it is not necessary to trim edges when the steel sheet is applied to a component, and a yield of the steel sheet is improved.

<Mechanical Properties>
[Tensile Strength: 1.400 MPa or More]
[Uniform Elongation: 5.0% or More]
[Value (R/t) Obtained by Dividing Limit Bend Radius R in 90° V-Bending by Sheet Thickness t: 5.0 or Less]

In the cold-rolled steel sheet according to the present embodiment, the tensile strength (TS) as a strength that contributes to a reduction in weight of a vehicle body is preferably set to 1,400 MPa or more. From the viewpoint of impact absorption, the tensile strength of the steel sheet is more preferably 1,470 MPa or more. It is not necessary to limit an upper limit of the tensile strength. However, there are cases where an increase in the tensile strength causes a decrease in formability. Therefore, the tensile strength may be set to 1,900 MPa or less.

In addition, from the viewpoint of formability, the uniform elongation (uEl) is preferably set to 5.0% or more. In order to improve the formability, the uniform elongation (uEl) is more preferably 5.5% or more. Although it is not necessary to limit an upper limit of the uniform elongation, the uniform elongation may be set to 30.0% or less or 20.0% or less.

In addition, from the viewpoint of bendability, a value obtained by dividing a limit bend radius R in 90° V-bending by the sheet thickness t (that is, a limit bend radius R standardized by a division by the sheet thickness t) (R/t) is preferably set to 5.0 or less. (R/t) is more preferably 4.0 or less and even more preferably 3.0 or less in order to improve the bendability. (R/t) may be set to 0.5 or more or 1.0 or more.

The tensile strength (TS) and uniform elongation (uEl) are obtained by collecting a JIS No. 5 tensile test piece from the steel sheet in the direction perpendicular to the rolling direction and performing a tensile test according to JIS Z 2241:2011.

The limit bend radius (R/t) standardized according to the sheet thickness is obtained by obtaining a minimum bend radius (limit bend radius) R at which no cracking occurs when a 90° V-bending die is used and a radius R is changed at a pitch of 0.5 mm, and dividing the minimum bend radius by the sheet thickness t.

The cold-rolled steel sheet according to the present embodiment may be provided with a hot-dip galvanized layer on the surface. Corrosion resistance is improved by providing a plating layer on the surface. When there is a concern about holes due to corrosion in a steel sheet for a vehicle, there are cases where the steel sheet cannot be thinned to a certain sheet thickness or less even if the high-strengthening is achieved. One of the purposes of the high-strengthening of the steel sheet is to reduce the weight by thinning. Therefore, even if a high strength steel sheet is developed, an application range of a steel sheet with low corrosion resistance is limited. As a method for solving these problems, it is conceivable to apply plating such as hot-dip galvanizing having high corrosion resistance to the steel sheet. In the cold-rolled steel sheet according to the present embodiment, since the composition of the steel sheet is controlled as described above, hot-dip galvanizing is possible.

The hot-dip galvanized layer may be a hot-dip galvannealed layer.

<Manufacturing Conditions>

Specifically, the cold-rolled steel sheet according to the present embodiment can be manufactured by a manufacturing method including the following configurations (I) to (XI):

(I) a hot rolling step of heating, as necessary, a cast slab having the above-described chemical composition, and performing hot rolling on the cast slab to obtain a hot-rolled steel sheet;

(II) a coiling step of cooling the hot-rolled steel sheet to a coiling temperature of 550° C. or lower and coiling the hot-rolled steel sheet at the coiling temperature;

(III) a cold rolling step of pickling the hot-rolled steel sheet and performing cold rolling on the hot-rolled steel sheet to obtain a cold-rolled steel sheet;

(IV) an annealing step of heating the cold-rolled steel sheet after the cold rolling step to a soaking temperature of 820° C. or higher in a nitrogen-hydrogen mixed atmosphere having a dew point of −20° C. or higher and 20° C. or lower and containing 1.0 volume % or more and 20 volume % or less of hydrogen as an in-furnace atmosphere during heating so that an average heating rate from 700° C. to the soaking temperature is slower than 10.0° C./sec, and annealing the cold-rolled steel sheet at the soaking temperature for 30 seconds or longer and 200 seconds or shorter;

(V) a first cooling step of cooling the cold-rolled steel sheet after the annealing step to a temperature range of higher than 425° C. and lower than 600° C.;

(VI) a holding step of allowing the cold-rolled steel sheet to stay in the temperature range of higher than 425° C. and lower than 600° C. for 200 seconds or longer and 750 seconds or shorter after the first cooling step;

(VII) a second cooling step of cooling the cold-rolled steel sheet to a temperature of 50° C. or higher and 250° C. or lower after the holding step;

(VIII) a tempering step of tempering the cold-rolled steel sheet at a temperature of 200° C. or higher and 350° C. or lower for 1 second or longer after the second cooling step;

(IX) a third cooling step of cooling the cold-rolled steel sheet to a temperature at which skin pass rolling is possible after the tempering step; and (X) a skin pass step of performing skin pass rolling on the cold-rolled steel sheet after the third cooling step, (XI) in which a temperature of the hot-rolled steel sheet is caused to reach 500° C. or lower within 10 hours from completion of the hot rolling step.

Hereinafter, each will be described.

[Hot Rolling Step]

In the hot rolling step, the cast slab having the above-described chemical composition is heated and hot-rolled to obtain the hot-rolled steel sheet. In a case where a temperature of the cast slab is high, the cast slab may be subjected to the hot rolling as it is without being cooled to around room temperature.

Hot rolling conditions are not limited, but it is preferable that the hot rolling is performed under conditions in which the cast slab is heated to 1.100° C. or higher and a finish rolling outlet side temperature is an Ar3 transformation point or higher. By setting a heating temperature to 1.100° C. or higher, it is possible to avoid insufficient homogenization of materials. In addition, when the finish rolling outlet side temperature is set to the Ar3 transformation point or higher, a deformed ferrite is not generated, and a uniform microstructure can be easily obtained, which is advantageous in improving the bendability.

The Ar3 transformation point (° C.) is simply represented by the following calculation formula as a relationship between amounts of elements in steel. That is, the Ar3 transformation point is described as in Formula (1) below.

$$Ar3=910-310\times[C]+25\times\{[Si]+2\times[Al]\}-80\times[Mn_{eq}] \quad (1)$$

Here, in a case where B is not contained, $[Mn_{eq}]$ is represented by Formula (2a) below.

$$[Mn_{eq}]=[Mn]+[Cr]+[Cu]+[Mo]+[Ni]/2+10([Nb]-0.02) \quad (2a)$$

In addition, in a case where B is contained. $[Mn_{eq}]$ is represented by Formula (2b) below.

$$[Mn_{eq}]=[Mn]+[Cr]+[Cu]+[Mo]+[Ni]/2+10([Nb]-0.02)+1 \quad (2b)$$

In the formulas, [C] is the C content (mass %), [Si] is the Si content (mass %), [Al] is the Al content (mass %), [Mn] is the Mn content (mass %), [Cr] is the Cr content (mass %), [Cu] is the Cu content (mass %), [Mo] is the Mo content (mass %). [Ni] is the Ni content (mass %), and [Nb] is the Nb content (mass %).

[Coiling Step]

After the hot rolling step, cooling to the coiling temperature is performed, and then coiling is performed. The coiling temperature is set to 550° C. or lower. When the coiling temperature is higher than 550° C. the microstructure of the hot-rolled steel sheet becomes a coarse ferrite-pearlite microstructure, the metallographic structure of the steel sheet after annealing becomes non-uniform, and the bendability deteriorates. In addition, the surface layer is greatly decarburized during the coiling, and the metallographic structure of the 75 μm portion after annealing cannot be controlled within the above range. Furthermore, since a cooling rate of edges is fast, a difference in the microstructure in the width direction of the hot-rolled steel sheet increases, and the metallographic structure after annealing becomes non-uniform in the width direction. The coiling temperature is preferably 525° C. or lower.

A lower limit of the coiling temperature is not limited. However, when the coiling temperature is low, there are cases where it is difficult to perform temperature control in the width direction. Therefore, the coiling temperature may be set to 450° C. or higher, 500° C. or higher, or 510° C. or higher.

In a case where the strength of the hot-rolled steel sheet is high, a softening heat treatment such as BAF may be performed before the cold rolling.

In the manufacturing method of the cold-rolled steel sheet according to the present embodiment, the temperature of the steel sheet is caused to reach 500° C. or lower within 10 hours from the completion of the hot rolling step. By causing the temperature of the steel sheet to be 500° C. or lower within 10 hours, the metallographic structures of the center portion in the sheet width direction and the edge portion become equivalent to each other.

The time from the completion of the hot rolling step until the temperature of the steel sheet reaches 500° C. or lower can be controlled by adjusting the cooling in the coiling step or cooling after the coiling.

The time from the completion of the hot rolling step until the temperature of the steel sheet reaches 500° C. or lower is preferably 5 hours or shorter.

Furthermore, it is preferable that the temperature of the steel sheet is caused to reach 450° C. or lower within 10 hours from the completion of the hot rolling step, and it is more preferable that the temperature of the steel sheet is caused to reach 450° C. or lower within 8 hours from the completion of the hot rolling step.

[Cold Rolling Step]

In the cold rolling step, the hot-rolled steel sheet that has been subjected to the hot rolling is descaled by pickling or the like and then cold-rolled to obtain the cold-rolled steel sheet. Cold rolling (cold rolling) conditions are not particularly limited. However, the bendability is improved by promoting recrystallization and forming a uniform metallographic structure after cold rolling and annealing. Therefore, a cold rolling reduction (cumulative rolling reduction) is preferably set to 40% or more. The cold rolling reduction is more preferably 45% or more, and even more preferably 50% or more.

When the cold rolling reduction is too high, a rolling force increases, and it becomes difficult to perform rolling. Therefore, the cold rolling reduction is preferably less than 70%. The cold rolling reduction is more preferably less than 65%, and even more preferably less than 60%.

[Annealing Step]

In the annealing step, the cold-rolled steel sheet after the cold rolling step is subjected to a treatment such as degreasing according to a known method as necessary, then heated to a soaking temperature of 820° C. or higher in a nitrogen-hydrogen mixed atmosphere having a dew point of −20° C.

or higher and 20° C. or lower and containing 1.0 volume % or more and 20 volume % or less of hydrogen as an in-furnace atmosphere during heating so that an average heating rate from 700° C. to the soaking temperature is slower than 10.0° C./sec, and annealed at the soaking temperature for 30 seconds or longer and 200 seconds or shorter.

By setting the in-furnace atmosphere (a heating zone and a soaking zone) to the nitrogen-hydrogen mixed atmosphere having a dew point of −20° C. or higher and 20° C. or lower and containing 1.0 volume % or more and 20 volume % or less of hydrogen and a remainder including nitrogen and impurities and performing annealing in this atmosphere, appropriate decarburization occurs in the surface layer area of the steel sheet. As a result, the 20 μm portion and the 75 μm portion can have a predetermined metallographic structure. That is, since the surface layer having a low C content due to decarburization undergoes ferritic transformation and bainitic transformation prior to the start of transformation of a central part having a high C content, only the surface layer area is softened, and decarburization beyond a necessary level is suppressed, so that the metallographic structure of the 75 μm portion can be equivalent to that of the t/4 portion.

However, since decarburization is likely to occur in a temperature range of 700° C. or higher, decarburization is promoted by performing heating to the soaking temperature so that the average heating rate from 700° C. to the soaking temperature is slower than 10.0° C./sec. The average heating rate in this temperature range is preferably slower than 8.0° C./sec, and more preferably slower than 5.0° C./sec. A lower limit of the average heating rate from 700° C. to the soaking temperature is not limited, but the average heating rate may be set to 1.0° C./sec or faster from the viewpoint of operation.

The soaking temperature in the annealing step is set to 820° C. or higher. When the soaking temperature is lower than 820° C. the volume percentage of ferrite in the t/4 portion from the surface increases, and a proportion of tempered martensite becomes insufficient, so that it becomes difficult to secure sufficient bendability. The soaking temperature is preferably 840° C. or higher, and more preferably 850° C. or higher. The strength can be easily secured with a high soaking temperature. However, when the soaking temperature is too high, a manufacturing cost increases. Therefore, the soaking temperature is preferably 900° C. or lower. The soaking temperature is more preferably 880° C. or lower, and even more preferably 870° C. or lower.

A soaking time is set to 30 seconds or longer and 200 seconds or shorter. By setting the soaking time to 30 seconds or longer, austenitizing can sufficiently proceed. On the other hand, from the viewpoint of productivity, the soaking time is set to 200 seconds or shorter.

[First Cooling Step]
[Holding Step]

In order to obtain an inclined microstructure as described above (that is, a microstructure in which there is a difference in the total volume percentage of ferrite and bainite between the 20 μm portion and the 75 μm portion), the cold-rolled steel sheet after the annealing step is cooled to a temperature range of higher than 425° C. and lower than 600° C. (first cooling step) and is held in this temperature range (higher than 425° C. and lower than 600° C.) for a staying time of 200 seconds or longer and 750 seconds or shorter (holding step). When a cooling stop temperature and a subsequent holding temperature are 425° C. or lower, the volume percentage of bainite in the t/4 portion increases, and the volume percentage of tempered martensite decreases. As a result, the tensile strength decreases and the bendability deteriorates.

On the other hand, when the cooling stop temperature and the subsequent holding temperature are 600° C. or higher, a ferrite fraction in the center portion of the steel sheet increases, and the volume percentage of tempered martensite decreases. As a result, the tensile strength decreases and the bendability deteriorates.

Therefore, the cooling stop temperature and the holding temperature are set to be higher than 425° C. and lower than 600° C. The holding temperature is preferably higher than 440° C. and lower than 580° C., and more preferably higher than 450° C. and lower than 560° C. As long as the holding temperature is within this temperature range, there is no problem even if the temperature is changed during the staying time.

In the first cooling step, cooling is preferably performed at an average cooling rate of 5.0° C./sec or faster in order to suppress ferritic transformation during cooling. The average cooling rate is more preferably 10.0° C./sec or faster.

When the staying time at higher than 425° C. and lower than 600° C. is shorter than 200 seconds, ferritic transformation and bainitic transformation of the surface layer (for example, the 20 μm portion) do not proceed, and untransformed austenite becomes martensite or tempered martensite after final cooling, which results in an increase in not only the volume percentages but also the grain size of martensite and tempered martensite. Therefore, the staying time at higher than 425° C. and shorter than 600° C. in the holding step is set to 200 seconds or longer. The staying time is preferably 300 seconds or longer, and more preferably 350 seconds or longer.

On the other hand, when the staying time is long, ferritic transformation and bainitic transformation occur even in the 75 μm portion and the t/4 portion, so that a desired microstructure cannot be obtained, the strength of the steel sheet decreases, and the bendability deteriorates. Therefore, an upper limit of the staying time at higher than 425° C. and lower than 600° C. is set to 750 seconds or shorter. The staying time at higher than 425° C. and lower than 600° C. is preferably 650 seconds or shorter, and more preferably 550 seconds or shorter.

In the holding step, from the viewpoint of chemical convertibility of the steel sheet or plating adhesion, it is preferable that the in-furnace atmosphere is a reducing atmosphere.

In a case of manufacturing a cold-rolled steel sheet (hot-dip galvanized steel sheet) having hot-dip galvanizing layer on a surface, the cold-rolled steel sheet may be immersed in a hot-dip plating bath to be subjected to hot-dip galvanizing during the holding step (hot-dip galvanizing step). In addition, in a case of manufacturing a cold-rolled steel sheet (hot-dip galvannealed steel sheet) having hot-dip galvannealed layer on a surface, an alloying treatment is performed subsequent to the above-described hot-dip galvanizing step to form hot-dip galvannealed layer as a plating (alloying step).

[Second Cooling Step]
[Tempering Step]

The cold-rolled steel sheet after the holding step is cooled to a temperature of 50° C. or higher and 250° C. or lower (second cooling step) so that untransformed austenite is transformed into martensite. In the second cooling step, it is preferable that cooling is performed at an average cooling rate of 5.0° C./sec or faster in order to suppress bainitic transformation during cooling. The average cooling rate is more preferably 10.0° C./sec or faster. Thereafter, the cold-rolled steel sheet is tempered at a temperature of 200° C. or higher and 350° C. or lower for 1 second or longer (tempering step), whereby a microstructure primarily containing tempered martensite is obtained at the ¼ position of the sheet thickness from the surface.

In a case where the hot-dip galvanizing step and/or the alloying step is performed, the cold-rolled steel sheet after the hot-dip galvanizing step or the cold-rolled steel sheet after the hot-dip galvanizing step and the alloying step is cooled to a temperature of 50° C. or higher and 250° C. or lower, and then tempered at a temperature of 200° C. or higher and 350° C. or lower for 1 second or longer.

When a cooling stop temperature in the second cooling step is higher than 250° C. martensitic transformation occurs insufficiently, the volume percentage of martensite that has not been tempered increases, and the bendability deteriorates. On the other hand, when the cooling stop temperature in the second cooling step is lower than 50° C., retained austenite does not remain and the ductility deteriorates. Therefore, the cooling stop temperature is set to 50° C. or higher and 250° C. or lower. The cooling stop temperature is preferably 75° C. or higher and 225° C. or lower, and more preferably 100° C. or higher and 200° C. or lower.

In the subsequent tempering step, when a tempering temperature is higher than 350° C., the strength of the steel sheet decreases. Therefore, the tempering temperature is set to 350° C. or lower. The tempering temperature is preferably 330° C. or lower, and more preferably 310° C. or lower.

On the other hand, when the tempering temperature is lower than 200° C., the tempering occurs insufficiently, and the bendability deteriorates. Therefore, the tempering temperature is set to 200° C. or higher. The tempering temperature is preferably 250° C. or higher, more preferably 260° C. or higher, and even more preferably 270° C. or higher.

A tempering time may be 1 second or longer, but is preferably 5 seconds or longer, and more preferably 10 seconds or longer in order to perform a stable tempering treatment. On the other hand, in order to avoid a decrease in the strength of the steel sheet, the tempering time is preferably 90 seconds or shorter, and more preferably 60 seconds or shorter.

In the present embodiment, the term "tempering" means cooling to the above-described tempering temperature in the second cooling step and then holding at the temperature, or cooling to a temperature lower than the tempering temperature in the second cooling step, then raising the temperature to the tempering temperature, and holding at the temperature. In addition, the term "holding" in the tempering step means not only maintaining at a constant temperature but also allowing a temperature change of 1.0° C./sec or less within the above-described tempering temperature range (that is, 200° C. or higher and 350° C. or lower).

[Third Cooling Step]
[Skin Pass Step]

The cold-rolled steel sheet after the tempering step is cooled to a temperature at which skin pass rolling is possible (third cooling step), and then the skin pass rolling is performed (skin pass step). In a case where the cooling after annealing (first cooling step) is water spray cooling using water, dip cooling, air-water cooling, or the like, in order to remove an oxide film formed by contact with water at a high temperature and improve chemical convertibility of the steel sheet, pickling and plating of a small amount of one or two or more of Ni, Fe, Co, Sn, and Cu may be performed before the skin pass rolling. Here, the small amount refers to a plating amount of about 3 to 30 mg/m$^2$ on the surface of the steel sheet.

A shape of the steel sheet can be adjusted by the skin pass rolling. An elongation ratio of the skin pass rolling is preferably 0.1% or more. The elongation is preferably 0.2% or more, and more preferably 0.3% or more. On the other hand, when the elongation ratio of the skin pass rolling is high, the volume percentage of retained austenite decreases, and the ductility deteriorates. Therefore, the elongation ratio is preferably set to 1.0% or less. The elongation ratio is more preferably 0.8% or less, even more preferably 0.6% or less, and still more preferably 0.5% or less.

Examples

The present invention will be described more specifically with reference to examples.

Slabs having the chemical compositions shown in Table 1 were cast. The slab after the casting was heated to 1,100° C. or higher, hot-rolled to 2.8 mm so that the finish rolling outlet side temperature was the Ar3 transformation point or higher, coiled at the coiling temperature shown in Tables 2A and 2B, and then cooled to room temperature. Here, the time from the completion of the hot rolling until the temperature of the steel sheet reached 500° C. or lower and the time until the temperature reached 450° C. or lower were as shown in Tables 2A and 2B.

Thereafter, descaling was performed by pickling, cold rolling to 1.4 mm was performed, and then annealing was performed under the conditions shown in Tables 2A and 2B. A holding time at the soaking temperature was 120 seconds. In addition, the in-furnace atmosphere was set to the nitrogen-hydrogen mixed atmosphere having a dew point of −20° C. or higher and 20° C. or lower and containing 1.0 volume % or more and 20 volume % or less of hydrogen.

After the annealing, the steel sheet was cooled to the holding temperature shown in Tables 2A and 2B at 10° C./sec (first cooling) and then allowed to stay at the temperature for the time shown in Tables 2A and 2B.

In some of the examples, hot-dip galvanizing and alloying were performed during holding. In Table 6. CR indicates a cold-rolled steel sheet that has not been galvanized, GI indicates a hot-dip galvanized steel sheet, and GA indicates a hot-dip galvannealed steel sheet. The hot-dip galvanized steel sheet was subjected to hot-dip galvanizing at about 35 to 65 g/m$^2$. The hot-dip galvannealed steel sheet was subjected to hot-dip galvanizing of about 35 to 65 g/m$^2$ and then alloying at a temperature of lower than 600°. In the examples, although the temperature during the staying time at higher than 425° C. and lower than 600° C. was set to be constant, the temperature during the staying time may be changed as described above as long as the temperature was within the temperature range.

In addition, after the holding, a heat treatment was performed in which cooling (second cooling) to a cooling stop temperature of 50° C. or higher and 250° C. or lower at 10.0° C./sec or faster was performed and thereafter tempering at a tempering temperature of 250° C. or higher and 350° C. or lower for 1 second or longer was performed. In a case where the cooling stop temperature was lower than the tempering temperature, tempering was performed by heating to the tempering temperature and holding at the temperature, and in a case where the cooling stop temperature was the same as the tempering temperature, tempering was performed by cooling and then holding at the temperature.

Thereafter, cooling (third cooling) to 50° C. was performed, and skin pass rolling with an elongation ratio of 0.1% to 1.0% was performed.

A test piece for SEM observation was collected from the obtained annealed steel sheet (cold-rolled steel sheet) as described above, a longitudinal section parallel to the rolling direction was polished, metallographic structures of the 20 μm portion, the 60 μm portion, the 75 μm portion, and the t/4 portion were observed, and the volume percentage of each microstructure was measured in the above-described manner. In addition, the average grain sizes of martensite and tempered martensite in the 20 μm portion were also obtained.

In addition, a test piece for X-ray diffraction was collected, and from a surface chemically polished to depth positions of 20 μm, 75 μm, and ¼ of the sheet thickness, the volume percentage of retained austenite was measured by X-ray diffraction.

The volume percentage of each microstructure in the t/4 portion was obtained at the center portion in the width direction. On the other hand, the volume percentage of each microstructure in the 20 μm portion, the 60 μm portion, and the 75 μm portion, and the average grain sizes of martensite and tempered martensite in the 20 μm portion were obtained at each of the edge portion, which was at a position 50 mm away from the end portion in the width direction of the steel sheet, and the center portion in the width direction.

The results are shown in Tables 3, 4A, 4B, 5A, and 5B.

The tensile strength (TS) and the uniform elongation (uEl) were obtained by collecting a JIS No. 5 tensile test piece from the center portion in the width direction of the obtained cold-rolled steel sheet in a direction perpendicular to the rolling direction, and conducting a tensile test according to JIS Z 2241 (2011). The results are shown in Table 6.

The limit bend radius (R/t) was obtained by obtaining a minimum bend radius R at which no cracking occurs in the center portion in the width direction of the obtained cold-rolled steel sheet when a 90° V-bending die was used and a radius R was changed at a pitch of 0.5 mm, and dividing the minimum bend radius by the sheet thickness (1.4 mm). The results are shown in Table 6.

In addition, the following test was conducted to evaluate the hydrogen embrittlement resistance. That is, a test piece having a mechanically ground end surface was bent into a U shape by a press bending method to prepare a U-bending test piece having a radius of 5R, the U-bending test piece was tightened with bolts to be elastically deformed so that non-bent portions were parallel to each other, and thereafter a delayed fracture acceleration test in which hydrogen was allowed to penetrate into the steel sheet was conducted by immersing the U-bending test piece in hydrochloric acid having a pH of 1. Those in which cracking did not occur even when an immersion time was 100 hours were evaluated as steel sheets having a good (OK) delayed fracture resistance property, and those in which cracking had occurred were evaluated as defective (NG). In order to remove an influence of plating, regarding a plating material, the plating layer was removed with hydrochloric acid containing an inhibitor before the test, and thereafter the hydrogen embrittlement resistance was evaluated. The results are shown in Table 6.

The component proof stress was obtained by the following method.

The obtained cold-rolled steel sheet was subjected to press bending at R5 to be formed into a hat shape having a height of 50 mm, an upper side of 70 mm, a lower side of 120 mm, and a length of 900 mm, a steel sheet having the same size was matched to the lower side, and a flange portion was fixed by spot welding, whereby a model component was produced. In addition, as the cold-rolled steel sheet, a steel sheet in which a metallographic structure of a surface layer (that is, a 20 μm portion) was the same as that of a t/4 portion was used, and a comparative component was produced in the same manner as in the model component. For each of the model component and the comparative component, a maximum load when the center portion was pressed against a circular indenter and bent was defined as the component proof stress. A case where the component proof stress of the model component satisfied 95% or more of the component proof stress of the comparative component was evaluated as OK.

However, a test for the component proof stress was conducted only on cold-rolled steel sheets having a tensile strength of 1,400 MPa or more and a limit bend radius (R/t) of 5.0 or less. The results are shown in Table 6.

TABLE 1

| | Chemical composition (mass %) (remainder: Fe and impurities) | | | | | | | |
|---|---|---|---|---|---|---|---|---|
| Steel | C | Si | Mn | P | S | Al | N | Others |
| A | 0.175 | 0.41 | 2.21 | 0.009 | 0.001 | 0.029 | 0.0031 | |
| B | 0.223 | 0.01 | 2.75 | 0.009 | 0.001 | 0.031 | 0.0036 | |
| C | 0.237 | 0.98 | 1.95 | 0.009 | 0.001 | 0.034 | 0.0032 | |
| D | 0.356 | 0.42 | 3.85 | 0.009 | 0.001 | 0.033 | 0.0028 | |
| E | 0.221 | 1.06 | 2.32 | 0.010 | 0.001 | 0.034 | 0.0032 | |
| F | 0.321 | 0.82 | 4.05 | 0.009 | 0.001 | 0.028 | 0.0027 | |
| G | 0.225 | 0.76 | 2.21 | 0.009 | 0.001 | 0.118 | 0.0032 | |
| H | 0.240 | 0.73 | 2.63 | 0.008 | 0.001 | 0.035 | 0.0031 | |
| I | 0.244 | 0.72 | 2.54 | 0.010 | 0.001 | 0.036 | 0.0032 | |
| J | 0.225 | 0.71 | 2.65 | 0.009 | 0.001 | 0.031 | 0.0033 | |
| K | 0.191 | 0.76 | 3.24 | 0.010 | 0.001 | 0.033 | 0.0035 | |
| L | 0.223 | 0.74 | 2.44 | 0.009 | 0.001 | 0.029 | 0.0030 | V: 0.10 |
| M | 0.244 | 0.75 | 2.53 | 0.009 | 0.001 | 0.040 | 0.0031 | Ti: 0.024 Nb: 0.008 B: 0.0017 |
| N | 0.341 | 0.76 | 2.23 | 0.010 | 0.001 | 0.032 | 0.0033 | Mo: 0.08 Cr: 0.28 |
| O | 0.233 | 0.77 | 2.57 | 0.009 | 0.001 | 0.036 | 0.0029 | Bi: 0.007 REM: 0.0009 |
| P | 0.231 | 0.75 | 2.45 | 0.008 | 0.001 | 0.027 | 0.0037 | Ca: 0.009 Mg: 0.0011 |
| Q | 0.232 | 0.76 | 2.44 | 0.009 | 0.001 | 0.029 | 0.0031 | Ni: 0.10 Cu: 0.12 |

TABLE 2A

| | | | | | Annealing | | Holding | |
|---|---|---|---|---|---|---|---|---|
| Test No. | Steel | Hot rolling Coiling temperature (° C.) | Time until 500° C. is reached (hr) | Time until 450° C. is reached (hr) | Average heating rate from 700° C. to soaking temperature (° C./sec) | Soaking temperature (° C.) | Holding temperature (° C.) | Staying time at the holding temperature listed at left (sec) |
| 1 | A | 520 | 4 | 6 | 2.5 | 825 | 480 | 450 |
| 2 | B | 520 | 4 | 6 | 2.5 | 835 | 490 | 300 |

TABLE 2A-continued

| Test No. | Steel | Hot rolling Coiling temperature (° C.) | Time until 500° C. is reached (hr) | Time until 450° C. is reached (hr) | Annealing Average heating rate from 700° C. to soaking temperature (° C./sec) | Soaking temperature (° C.) | Holding Holding temperature (° C.) | Staying time at the holding temperature listed at left (sec) |
|---|---|---|---|---|---|---|---|---|
| 3 | C | 525 | 5 | 7 | 2.5 | 830 | 500 | 450 |
| 4 | D | 510 | 3 | 4 | 2.5 | 825 | 505 | 450 |
| 5 | E | 520 | 4 | 6 | 2.5 | 820 | 430 | 450 |
| 6 | E | 510 | 3 | 4 | 2.5 | 850 | 520 | 420 |
| 7 | F | 525 | 5 | 7 | 2.5 | 820 | 500 | 470 |
| 8 | G | 525 | 5 | 7 | 2.5 | 825 | 550 | 470 |
| 9 | H | 520 | 5 | 7 | 2.5 | 845 | 500 | 470 |
| 10 | H | 560 | 9 | 13 | 2.5 | 845 | 505 | 465 |
| 11 | H | 545 | 11 | 14 | 2.5 | 845 | 495 | 475 |
| 12 | H | 525 | 5 | 7 | 2.5 | 810 | 520 | 420 |
| 13 | H | 520 | 5 | 7 | 2.5 | 850 | 415 | 210 |
| 14 | H | 510 | 3 | 4 | 2.5 | 845 | 610 | 230 |
| 15 | H | 510 | 4 | 6 | 2.5 | 845 | 505 | 60 |
| 16 | H | 525 | 5 | 7 | 2.5 | 845 | 510 | 195 |
| 17 | H | 510 | 3 | 4 | 2.5 | 850 | 495 | 780 |
| 18 | H | 520 | 4 | 6 | 2.5 | 855 | 500 | 250 |
| 19 | H | 520 | 4 | 6 | 9.0 | 835 | 550 | 400 |

TABLE 2B

| Test No. | Steel | Hot rolling Coiling temperature (° C.) | Time until 500° C. is reached (hr) | Time until 450° C. is reached (hr) | Annealing Average heating rate from 700° C. to soaking temperature (° C./sec) | Soaking temperature (° C.) | Holding Holding temperature (° C.) | Staying time at the holding temperature listed at left (sec) |
|---|---|---|---|---|---|---|---|---|
| 20 | H | 525 | 5 | 7 | 2.5 | 820 | 560 | 400 |
| 21 | H | 520 | 4 | 6 | 2.5 | 825 | 505 | 400 |
| 22 | H | 525 | 5 | 7 | 2.5 | 825 | 520 | 650 |
| 23 | H | 520 | 4 | 6 | 2.5 | 845 | 545 | 350 |
| 24 | H | 525 | 5 | 7 | 2.5 | 845 | 510 | 550 |
| 25 | H | 510 | 3 | 4 | 2.5 | 850 | 460 | 360 |
| 26 | H | 520 | 4 | 6 | 2.5 | 845 | 470 | 350 |
| 27 | H | 525 | 5 | 7 | 2.5 | 820 | 580 | 420 |
| 28 | I | 510 | 3 | 4 | 2.5 | 845 | 495 | 450 |
| 29 | J | 510 | 4 | 6 | 2.5 | 845 | 520 | 370 |
| 30 | K | 520 | 5 | 7 | 2.5 | 840 | 490 | 350 |
| 31 | L | 525 | 5 | 7 | 2.5 | 835 | 490 | 450 |
| 32 | M | 510 | 4 | 6 | 2.5 | 840 | 500 | 450 |
| 33 | M | 525 | 5 | 7 | 2.5 | 845 | 505 | 415 |
| 34 | N | 510 | 3 | 4 | 2.5 | 825 | 580 | 710 |
| 35 | O | 510 | 4 | 6 | 2.5 | 820 | 510 | 420 |
| 36 | O | 510 | 4 | 6 | 2.5 | 855 | 500 | 470 |
| 37 | P | 525 | 5 | 7 | 2.5 | 850 | 500 | 450 |
| 38 | Q | 530 | 5 | 7 | 2.5 | 855 | 500 | 470 |

TABLE 3

Metallographic structure of cold-rolled steel sheet (% indicates volume percentage) t/4 portion

| Test No. | Ferrite (%) | Bainite (%) | Ferrite and bainite in total (%) | Retained austenite (%) | Martensite (%) | Tempered martensite (%) | Remainder (%) |
|---|---|---|---|---|---|---|---|
| 1 | 4.2 | 10.9 | 15.1 | 3.2 | 0.0 | 81.7 | 0.0 |
| 2 | 0.0 | 5.6 | 5.6 | 2.1 | 0.0 | 92.3 | 0.0 |
| 3 | 3.1 | 25.2 | 28.3 | 5.2 | 0.0 | 66.5 | 0.0 |
| 4 | 0.0 | 0.0 | 0.0 | 7.6 | 5.4 | 87.0 | 0.0 |
| 5 | 15.4 | 35.4 | 50.8 | 10.3 | 6.4 | 32.5 | 0.0 |
| 6 | 0.0 | 14.6 | 14.6 | 5.1 | 0.0 | 80.3 | 0.0 |

TABLE 3-continued

Metallographic structure of cold-rolled steel sheet (% indicates volume percentage)
t/4 portion

| Test No. | Ferrite (%) | Bainite (%) | Ferrite and bainite in total (%) | Retained austenite (%) | Martensite (%) | Tempered martensite (%) | Remainder (%) |
|---|---|---|---|---|---|---|---|
| 7 | 0.0 | 0.0 | 0.0 | 6.1 | 5.2 | 88.7 | 0.0 |
| 8 | 25.4 | 0.0 | 25.4 | 6.4 | 0.0 | 68.2 | 0.0 |
| 9 | 0.0 | 9.8 | 9.8 | 5.0 | 0.0 | 85.2 | 0.0 |
| 10 | 0.0 | 9.5 | 9.5 | 4.9 | 0.0 | 85.6 | 0.0 |
| 11 | 0.0 | 10.2 | 10.2 | 5.1 | 0.0 | 84.7 | 0.0 |
| 12 | 18.6 | 3.6 | 22.2 | 6.0 | 1.4 | 70.4 | 0.0 |
| 13 | 0.0 | 20.4 | 20.4 | 6.2 | 1.5 | 71.9 | 0.0 |
| 14 | 22.4 | 0.0 | 22.4 | 5.9 | 1.4 | 64.9 | 5.4 |
| 15 | 0.0 | 1.2 | 1.2 | 5.3 | 0.0 | 93.5 | 0.0 |
| 16 | 0.0 | 3.1 | 3.1 | 5.2 | 0.0 | 91.7 | 0.0 |
| 17 | 0.0 | 25.2 | 25.2 | 5.1 | 0.0 | 76.1 | 0.0 |
| 18 | 0.0 | 3.9 | 3.9 | 5.0 | 0.0 | 91.1 | 0.0 |
| 19 | 8.6 | 0.0 | 8.6 | 5.2 | 0.0 | 85.4 | 0.8 |
| 20 | 10.5 | 0.0 | 10.5 | 5.1 | 0.0 | 83.1 | 1.3 |
| 21 | 3.8 | 4.8 | 8.6 | 5.4 | 0.0 | 85.1 | 0.9 |
| 22 | 3.8 | 10.1 | 13.9 | 5.5 | 0.0 | 80.6 | 0.0 |
| 23 | 0.0 | 0.0 | 0.0 | 5.1 | 0.0 | 94.9 | 0.0 |
| 24 | 0.0 | 11.5 | 11.5 | 5.9 | 0.0 | 82.6 | 0.0 |
| 25 | 0.0 | 14.7 | 14.7 | 5.2 | 0.0 | 80.1 | 0.0 |
| 26 | 0.0 | 10.8 | 10.8 | 5.3 | 0.0 | 83.9 | 0.0 |
| 27 | 12.2 | 0.0 | 12.2 | 5.3 | 0.0 | 80.4 | 2.1 |
| 28 | 0.0 | 9.2 | 9.2 | 5.5 | 0.0 | 85.3 | 0.0 |
| 29 | 0.0 | 0.0 | 0.0 | 5.3 | 0.0 | 94.7 | 0.0 |
| 30 | 0.0 | 3.1 | 3.1 | 5.1 | 0.0 | 91.8 | 0.0 |
| 31 | 0.0 | 9.8 | 9.8 | 5.6 | 0.0 | 84.6 | 0.0 |
| 32 | 0.0 | 10.1 | 10.1 | 5.6 | 0.0 | 84.3 | 0.0 |
| 33 | 0.0 | 9.3 | 9.3 | 5.5 | 0.0 | 85.2 | 0.0 |
| 34 | 8.7 | 0.0 | 8.7 | 7.4 | 2.8 | 80.2 | 0.9 |
| 35 | 3.7 | 6.5 | 10.2 | 5.4 | 0.0 | 84.4 | 0.0 |
| 36 | 0.0 | 8.5 | 8.5 | 5.5 | 0.0 | 86.0 | 0.0 |
| 37 | 0.0 | 9.7 | 9.7 | 5.6 | 0.0 | 84.7 | 0.0 |
| 38 | 0.0 | 9.6 | 9.6 | 5.5 | 0.0 | 84.9 | 0.0 |

TABLE 4A

Metallographic structure of cold-rolled steel sheet (% indicates volume percentage)

| Test No. | Position 75 μm away from surface (center portion in width direction) | | | Position 60 μm away from surface (center portion in width direction) | Position 20 μm away from surface (center portion in width direction) | | | | |
|---|---|---|---|---|---|---|---|---|---|
| | Ferrite (%) | Bainite (%) | Ferrite and bainite in total (%) | Ferrite and bainite in total (%) | Ferrite (%) | Bainite (%) | Ferrite and bainite in total (%) | Martensite and tempered martensite in total (%) | Average grain size of martensite and tempered martensite (μm) |
| 1 | 4.3 | 11.2 | 15.5 | 18.7 | 74.6 | 10.8 | 85.4 | 15 | 3.5 |
| 2 | 0.0 | 5.7 | 5.7 | 7.6 | 25.2 | 51.5 | 76.7 | 23 | 4.6 |
| 3 | 3.2 | 25.3 | 28.5 | 33.1 | 20.8 | 55.4 | 76.2 | 24 | 4.3 |
| 4 | 0.0 | 0.0 | 0.0 | 1.4 | 20.1 | 22.4 | 42.5 | 58 | 9.3 |
| 5 | 50.2 | 30.1 | 80.3 | 80.7 | 50.6 | 31.4 | 82.0 | 18 | 3.8 |
| 6 | 10.6 | 25.4 | 36.0 | 38.7 | 48.6 | 35.4 | 84.0 | 16 | 3.7 |
| 7 | 0.0 | 0.0 | 0.0 | 1.4 | 22.4 | 25.1 | 47.5 | 53 | 7.7 |
| 8 | 25.6 | 0.0 | 25.6 | 28.4 | 56.4 | 28.1 | 84.5 | 16 | 3.6 |
| 9 | 0.0 | 10.0 | 10.0 | 11.5 | 28.0 | 54.0 | 82.0 | 18 | 3.5 |
| 10 | 4.5 | 10.8 | 15.3 | 17.9 | 29.2 | 53.1 | 82.3 | 18 | 3.5 |
| 11 | 0.0 | 10.2 | 10.2 | 11.6 | 27.6 | 56.2 | 83.8 | 18 | 3.5 |
| 12 | 25.4 | 20.1 | 45.5 | 54.2 | 59.4 | 27.6 | 87.0 | 13 | 3.6 |
| 13 | 0.0 | 20.5 | 20.5 | 23.3 | 3.7 | 71.4 | 75.1 | 25 | 4.5 |
| 14 | 22.5 | 2.1 | 24.6 | 29.0 | 60.9 | 3.5 | 64.4 | 36 | 6.2 |
| 15 | 0.0 | 1.3 | 1.3 | 2.4 | 19.5 | 37.2 | 56.7 | 43 | 7.3 |
| 16 | 0.0 | 3.2 | 3.2 | 5.6 | 22.9 | 45.7 | 68.6 | 31 | 5.3 |
| 17 | 0.0 | 25.4 | 25.4 | 29.3 | 30.8 | 53.7 | 84.5 | 13 | 3.7 |
| 18 | 0.0 | 4.1 | 4.1 | 6.0 | 26.8 | 48.9 | 75.7 | 24 | 4.7 |
| 19 | 8.4 | 0.0 | 8.4 | 11.2 | 47.2 | 30.0 | 77.2 | 23 | 4.5 |

TABLE 4B

Metallographic structure of cold-rolled steel sheet (% indicates volume percentage)

| Test No. | Position 75 μm away from surface (center portion in width direction) | | | Position 60 μm away from surface (center portion in width direction) | Position 20 μm away from surface (center portion in width direction) | | | | |
|---|---|---|---|---|---|---|---|---|---|
| | Ferrite (%) | Bainite (%) | Ferrite and bainite in total (%) | Ferrite and bainite in total (%) | Ferrite (%) | Bainite (%) | Ferrite and bainite in total (%) | Martensite and tempered martensite in total (%) | Average grain size of martensite and tempered martensite (μm) |
| 20 | 10.6 | 0.0 | 10.6 | 12.0 | 47.5 | 30.2 | 77.7 | 22 | 4.5 |
| 21 | 3.9 | 4.7 | 8.6 | 9.7 | 32.1 | 51.8 | 83.9 | 16 | 4.0 |
| 22 | 3.9 | 10.2 | 14.1 | 14.6 | 36.1 | 49.1 | 85.2 | 15 | 3.7 |
| 23 | 0.0 | 0.0 | 0.0 | 2.4 | 44.2 | 34.2 | 78.4 | 22 | 4.1 |
| 24 | 0.0 | 11.4 | 11.4 | 13.5 | 32.0 | 53.9 | 85.9 | 14 | 3.7 |
| 25 | 0.0 | 14.8 | 14.8 | 15.0 | 7.5 | 77.9 | 85.4 | 15 | 3.6 |
| 26 | 0.0 | 11.2 | 11.2 | 12.4 | 11.1 | 72.9 | 84.0 | 16 | 3.7 |
| 27 | 12.3 | 0.0 | 12.3 | 13.6 | 50.9 | 25.0 | 75.9 | 24 | 4.7 |
| 28 | 0.0 | 9.3 | 9.3 | 10.4 | 32.4 | 53.8 | 86.2 | 14 | 3.7 |
| 29 | 0.0 | 0.0 | 0.0 | 2.1 | 40.8 | 41.3 | 82.1 | 18 | 3.9 |
| 30 | 0.0 | 3.2 | 3.2 | 4.3 | 14.6 | 62.4 | 77.0 | 23 | 4.8 |
| 31 | 0.0 | 10.0 | 10.0 | 11.7 | 30.3 | 53.6 | 83.9 | 16 | 3.7 |
| 32 | 0.0 | 10.0 | 10.0 | 11.4 | 32.1 | 53.4 | 85.5 | 15 | 3.7 |
| 33 | 0.0 | 9.5 | 9.5 | 10.5 | 31.2 | 53.3 | 84.5 | 16 | 3.7 |
| 34 | 8.6 | 0.0 | 8.6 | 9.7 | 56.9 | 26.1 | 83.0 | 17 | 3.7 |
| 35 | 3.8 | 6.4 | 10.2 | 11.6 | 30.1 | 54.1 | 84.2 | 16 | 3.8 |
| 36 | 0.0 | 8.4 | 8.4 | 10.1 | 31.2 | 52.6 | 83.8 | 16 | 3.7 |
| 37 | 0.0 | 9.8 | 9.8 | 10.8 | 31.6 | 53.0 | 84.6 | 15 | 3.6 |
| 38 | 0.0 | 9.7 | 9.7 | 10.6 | 31.5 | 52.7 | 84.2 | 16 | 3.6 |

TABLE 5A

Metallographic structure of cold-rolled steel sheet (% indicates volume percentage)

| Test No. | Position 75 μm away from surface (edge portion in width direction) | | | Position 60 μm away from surface (edge portion in width direction) | Position 20 μm away from surface (edge portion in width direction) | | | | |
|---|---|---|---|---|---|---|---|---|---|
| | Ferrite (%) | Bainite (%) | Ferrite and bainite in total (%) | Ferrite and bainite in total (%) | Ferrite (%) | Bainite (%) | Ferrite and bainite in total (%) | Martensite and tempered martensite in total (%) | Average grain size of martensite and tempered martensite (μm) |
| 1 | 4.2 | 11.3 | 15.5 | 18.6 | 74.5 | 10.7 | 85.2 | 15 | 3.5 |
| 2 | 0.0 | 5.6 | 5.6 | 7.4 | 25.3 | 51.6 | 76.9 | 23 | 4.5 |
| 3 | 3.1 | 25.2 | 28.3 | 32.8 | 20.7 | 55.3 | 76.0 | 24 | 4.4 |
| 4 | 0.0 | 0.0 | 0.0 | 1.2 | 20.2 | 22.3 | 42.5 | 58 | 9.2 |
| 5 | 50.2 | 29.9 | 80.1 | 80.6 | 50.5 | 31.2 | 81.7 | 18 | 3.7 |
| 6 | 10.5 | 25.3 | 35.8 | 38.4 | 48.5 | 35.3 | 83.8 | 16 | 3.8 |
| 7 | 0.0 | 0.0 | 0.0 | 1.3 | 22.3 | 25.0 | 47.3 | 53 | 7.6 |
| 8 | 25.4 | 0.0 | 25.4 | 28.1 | 56.2 | 28.2 | 84.4 | 16 | 3.7 |
| 9 | 0.0 | 10.1 | 10.1 | 11.4 | 27.9 | 53.6 | 81.5 | 19 | 3.6 |
| 10 | 4.4 | 10.7 | 15.1 | 17.4 | 29.1 | 53.0 | 82.1 | 18 | 3.5 |
| 11 | 0.0 | 10.1 | 10.1 | 11.4 | 16.0 | 38.5 | 54.5 | 46 | 6.8 |
| 12 | 25.3 | 20.0 | 45.3 | 55.6 | 59.3 | 27.4 | 86.7 | 13 | 3.7 |
| 13 | 0.0 | 20.4 | 20.4 | 23.4 | 3.6 | 71.3 | 74.9 | 25 | 4.4 |
| 14 | 22.4 | 2.0 | 24.4 | 29.2 | 60.8 | 3.6 | 64.4 | 36 | 6.3 |
| 15 | 0.0 | 1.2 | 1.2 | 2.5 | 19.6 | 37.1 | 56.7 | 43 | 7.2 |
| 16 | 0.0 | 3.3 | 3.3 | 5.5 | 22.8 | 45.6 | 68.4 | 32 | 5.4 |
| 17 | 0.0 | 25.5 | 25.5 | 29.4 | 30.7 | 53.6 | 84.3 | 16 | 3.8 |
| 18 | 0.0 | 3.9 | 3.9 | 5.6 | 26.7 | 48.8 | 75.5 | 25 | 4.6 |
| 19 | 8.2 | 0.0 | 8.2 | 11.4 | 47.5 | 30.4 | 77.9 | 24 | 4.6 |

TABLE 5B

Metallographic structure of cold-rolled steel sheet (% indicates volume percentage)

| Test No. | Position 75 μm away from surface (edge portion in width direction) | | | Position 60 μm away from surface (edge portion in width direction) | Position 20 μm away from surface (edge portion in width direction) | | | | Average grain size of martensite and tempered martensite (μm) |
|---|---|---|---|---|---|---|---|---|---|
| | Ferrite (%) | Bainite (%) | Ferrite and bainite in total (%) | Ferrite and bainite in total (%) | Ferrite (%) | Bainite (%) | Ferrite and bainite in total (%) | Martensite and tempered martensite in total (%) | |
| 20 | 10.6 | 0.0 | 10.6 | 11.8 | 47.6 | 30.1 | 77.7 | 22 | 4.5 |
| 21 | 4.0 | 4.6 | 8.6 | 10.0 | 32.1 | 51.7 | 83.8 | 16 | 4.1 |
| 22 | 3.8 | 10.1 | 13.9 | 14.7 | 36.2 | 48.8 | 85.0 | 15 | 3.6 |
| 23 | 0.0 | 0.0 | 0.0 | 2.1 | 44.1 | 34.1 | 78.2 | 22 | 4.2 |
| 24 | 0.0 | 11.3 | 11.3 | 13.4 | 31.9 | 53.8 | 85.7 | 14 | 3.6 |
| 25 | 0.0 | 14.6 | 14.6 | 15.0 | 7.3 | 77.8 | 85.1 | 15 | 3.7 |
| 26 | 0.0 | 11.1 | 11.1 | 12.1 | 10.9 | 73.0 | 83.9 | 16 | 3.6 |
| 27 | 12.1 | 0.0 | 12.1 | 13.4 | 50.7 | 25.1 | 75.8 | 24 | 4.8 |
| 28 | 0.0 | 9.2 | 9.2 | 10.5 | 32.3 | 53.6 | 85.9 | 14 | 3.8 |
| 29 | 0.0 | 0.0 | 0.0 | 2.4 | 40.7 | 41.2 | 81.9 | 18 | 3.8 |
| 30 | 0.0 | 3.1 | 3.1 | 4.6 | 14.5 | 62.3 | 76.8 | 23 | 4.7 |
| 31 | 0.0 | 9.9 | 9.9 | 11.5 | 30.2 | 53.5 | 83.7 | 16 | 3.6 |
| 32 | 0.0 | 10.1 | 10.1 | 11.6 | 32.0 | 53.3 | 85.3 | 15 | 3.8 |
| 33 | 0.0 | 9.4 | 9.4 | 10.3 | 31.0 | 53.1 | 84.1 | 16 | 3.6 |
| 34 | 8.5 | 0.0 | 8.5 | 9.8 | 56.8 | 26.2 | 83.0 | 17 | 3.8 |
| 35 | 3.8 | 6.3 | 10.1 | 11.4 | 30.1 | 54.2 | 84.1 | 16 | 3.7 |
| 36 | 0.0 | 8.3 | 8.3 | 10.3 | 31.1 | 52.5 | 83.6 | 16 | 3.8 |
| 37 | 0.0 | 9.7 | 9.7 | 10.9 | 31.5 | 52.8 | 84.3 | 16 | 3.6 |
| 38 | 0.0 | 9.6 | 9.6 | 10.7 | 31.2 | 52.5 | 83.7 | 16 | 3.7 |

TABLE 6

| Test No. | Presence or absence of plating[2] CR/GA/GI | Mechanical properties | | | Hydrogen embrittlement resistance | Component proof stress[3] | Note |
|---|---|---|---|---|---|---|---|
| | | TS (MPa) | Uniform elongation (%) | Limit bend radius[1] (R/t) | | | |
| 1 | CR | 1295 | 5.2 | 5.0 | OK | — | Comparative Example |
| 2 | CR | 1565 | 5.1 | 4.6 | OK | OK | Invention Example |
| 3 | CR | 1361 | 7.4 | 5.0 | OK | — | Comparative Example |
| 4 | CR | 1972 | 6.4 | 6.4 | NG | — | Comparative Example |
| 5 | CR | 926 | 16.4 | 5.0 | OK | — | Comparative Example |
| 6 | CR | 1420 | 6.8 | 5.0 | OK | NG | Comparative Example |
| 7 | GA | 1620 | 6.4 | 6.8 | NG | — | Comparative Example |
| 8 | CR | 1295 | 8.1 | 3.9 | OK | — | Comparative Example |
| 9 | CR | 1486 | 6.2 | 2.5 | OK | OK | Example |
| 10 | CR | 1482 | 6.3 | 2.5 | OK | NG | Comparative Example |
| 11 | CR | 1488 | 6.2 | 2.5 | OK | OK | Comparative Example |
| 12 | CR | 1322 | 7.7 | 5.4 | OK | — | Comparative Example |
| 13 | CR | 1295 | 8.0 | 5.4 | OK | — | Comparative Example |
| 14 | GA | 1250 | 8.2 | 5.4 | OK | — | Comparative Example |
| 15 | CR | 1585 | 6.1 | 5.4 | NG | — | Comparative Example |
| 16 | CR | 1565 | 6.0 | 5.4 | NG | — | Comparative Example |
| 17 | CR | 1309 | 6.9 | 5.4 | OK | — | Comparative Example |
| 18 | CR | 1565 | 6.0 | 2.5 | OK | OK | Invention Example |
| 19 | GA | 1471 | 6.3 | 2.9 | OK | OK | Invention Example |
| 20 | GA | 1452 | 6.3 | 2.9 | OK | OK | Invention Example |
| 21 | CR | 1490 | 6.4 | 2.5 | OK | OK | Invention Example |
| 22 | GA | 1401 | 5.9 | 2.9 | OK | OK | Invention Example |
| 23 | CR | 1588 | 5.7 | 2.1 | OK | OK | Invention Example |
| 24 | CR | 1449 | 7.0 | 2.9 | OK | OK | Invention Example |
| 25 | GA | 1419 | 6.8 | 2.9 | OK | OK | Invention Example |
| 26 | CR | 1463 | 6.7 | 2.5 | OK | OK | Invention Example |
| 27 | CR | 1415 | 6.7 | 2.9 | OK | OK | Invention Example |
| 28 | CR | 1480 | 6.8 | 2.5 | OK | OK | Invention Example |
| 29 | GA | 1580 | 6.1 | 2.1 | OK | OK | Invention Example |
| 30 | CR | 1402 | 7.2 | 2.1 | OK | OK | Invention Example |
| 31 | CR | 1475 | 6.7 | 2.5 | OK | OK | Invention Example |
| 32 | GA | 1477 | 6.4 | 2.5 | OK | OK | Invention Example |
| 33 | CR | 1485 | 6.4 | 2.5 | OK | OK | Invention Example |
| 34 | CR | 1844 | 6.5 | 4.6 | OK | OK | Invention Example |

TABLE 6-continued

| Test No. | Presence or absence of plating[2] CR/GA/GI | Mechanical properties | | | Hydrogen embrittlement resistance | Component proof stress[3] | Note |
|---|---|---|---|---|---|---|---|
| | | TS (MPa) | Uniform elongation (%) | Limit bend radius[1] (R/t) | | | |
| 35 | GA | 1471 | 6.4 | 2.5 | OK | OK | Invention Example |
| 36 | GI | 1493 | 6.3 | 2.5 | OK | OK | Invention Example |
| 37 | GA | 1475 | 6.6 | 2.5 | OK | OK | Invention Example |
| 38 | GA | 1479 | 6.7 | 2.5 | OK | OK | Invention Example |

[1] Limit bend radius is obtained by dividing a bend radius R at which cracking had occurred in 90° V-bending by the sheet thickness t
[2] CR indicates a non-plated material, GA indicates hot-dip galvannealing, and GI indicates hot-dip galvanizing
[3] A case where a component strength of a surface layer is 95% or more of a component strength when the same material as a center portion microstructure material is used was evaluated as OK As can be seen from Tables 1 to 6, in invention examples in which the chemical composition and the metallographic structures of the t/4 portion, the 20 μm portion, and the 75 μm portion were within the ranges of the present invention, high strength and excellent bendability were exhibited, and the component proof stress was also sufficient.

Contrary to this, in comparative examples in which one or more of the chemical composition and the metallographic structures of the t/4 portion, the 20 μm portion, and the 75 μm portion were outside of the ranges of the present invention, any one or more of strength, bendability, and component proof stress did not satisfy the target.

In Test No. 11 (comparative example) in which "Ferrite and bainite in total (%)", "Martensite and tempered martensite in total (%)", and "Average grain size of martensite and tempered martensite (μm)" at the position 20 μm away from the surface at the edge portion in the width direction were outside of the ranges of the present invention, although not shown in the tables, R/t (a value obtained by dividing the limit bend radius R in 90° V-bending by the sheet thickness t) measured at the edge portion in the width direction (position 50 mm away from the end portion in the width direction of the steel sheet) was as high as more than 5.0, and an overall quality of the steel sheet was not satisfied. As a result, a yield was significantly reduced.

What is claimed is:

1. A cold-rolled steel sheet comprising, as a chemical composition, by mass %:
C: 0.180% or more and 0.350% or less;
Mn: 2.00% or more and 4.00% or less;
P: 0% or more and 0.100% or less;
S: 0% or more and 0.010% or less;
Al: 0% or more and 0.100% or less;
N: 0% or more and 0.0100% or less;
Si: 0% or more and 1.00% or less;
Ti: 0% or more and 0.050% or less;
Nb: 0% or more and 0.050% or less;
V: 0% or more and 0.50% or less;
Cu: 0% or more and 1.00% or less;
Ni: 0% or more and 1.00% or less;
Cr: 0% or more and 1.00% or less;
Mo: 0% or more and 0.50% or less;
B: 0% or more and 0.0100% or less;
Ca: 0% or more and 0.010% or less;
Mg: 0% or more and 0.0100% or less;
REM: 0% or more and 0.0500% or less;
Bi: 0% or more and 0.050% or less; and
a remainder of Fe and impurities,
wherein a metallographic structure of a t/4 portion, which is at a ¼ position of a sheet thickness t from a surface of the cold-rolled steel sheet in a sheet thickness direction, in a longitudinal section parallel to a rolling direction of a center portion, which is a center position in a width direction, includes, by volume percentage,
retained austenite: 2.0% or more and 8.0% or less,
tempered martensite: 80.0% or more and 98.0% or less,
ferrite and bainite: 0.0% or more and 15.0% or less in total, and
martensite: 0.0% or more and 5.0% or less, and
in both a longitudinal section of an edge portion, which is at a position 50 mm away from an end portion of the cold-rolled steel sheet in a width direction, and the longitudinal section of the center portion of the cold-rolled steel sheet in the width direction,
a metallographic structure of a 20 μm portion, which is at a position 20 μm away from the surface in the sheet thickness direction, includes, by volume percentage,
ferrite and bainite: 75.0% or more and 100.0% or less in total, and
martensite and tempered martensite: 0.0% or more and 25.0% or less in total,
an average grain size of the martensite and the tempered martensite, when either is present or both are present, in the metallographic structure of each of the 20 μm portions is 5.0 μm or less, and
a metallographic structure of a 75 μm portion, which is at a position 75 μm away from the surface in the sheet thickness direction, in the longitudinal sections of each of the center portion and the edge portion, includes, by volume percentage,
ferrite and bainite: 0.0% or more and 15.0% or less in total.

2. The cold-rolled steel sheet according to claim 1, comprising, as the chemical composition, by mass %, one or more of:
Si: 0.005% or more and 1.00% or less;
Ti: 0.001% or more and 0.050% or less;
Nb: 0.001% or more and 0.050% or less;
V: 0.01% or more and 0.50% or less;
Cu: 0.01% or more and 1.00% or less;
Ni: 0.01% or more and 1.00% or less;
Cr: 0.01% or more and 1.00% or less;
Mo: 0.01% or more and 0.50% or less;
B: 0.0001% or more and 0.0100% or less;
Ca: 0.0001% or more and 0.010% or less;
Mg: 0.0001% or more and 0.0100% or less;
REM: 0.0005% or more and 0.0500% or less; and
Bi: 0.0005% or more and 0.050% or less.

3. The cold-rolled steel sheet according to claim 2, wherein
a tensile strength is 1,400 MPa or more,
a uniform elongation is 5.0% or more, and R/t, which is a value obtained by dividing a limit bend radius R in 90° V-bending by the sheet thickness t, is 5.0 or less.

4. The cold-rolled steel sheet according to claim 3, wherein a hot-dip galvanized layer is formed on the surface.

5. The cold-rolled steel sheet according to claim 4, wherein the hot-dip galvanized layer is a hot-dip galvannealed layer.

6. The cold-rolled steel sheet according to claim 2, wherein a hot-dip galvanized layer is formed on the surface.

7. The cold-rolled steel sheet according to claim 6, wherein the hot-dip galvanized layer is a hot-dip galvannealed layer.

8. The cold-rolled steel sheet according to claim 1, wherein
   a tensile strength is 1,400 MPa or more,
   a uniform elongation is 5.0% or more, and
   R/t, which is a value obtained by dividing a limit bend radius R in 90° V-bending by the sheet thickness t, is 5.0 or less.

9. The cold-rolled steel sheet according to claim 8, wherein a hot-dip galvanized layer is formed on the surface.

10. The cold-rolled steel sheet according to claim 9, wherein the hot-dip galvanized layer is a hot-dip galvannealed layer.

11. The cold-rolled steel sheet according to claim 1, wherein a hot-dip galvanized layer is formed on the surface.

12. The cold-rolled steel sheet according to claim 11, wherein the hot-dip galvanized layer is a hot-dip galvannealed layer.

13. A manufacturing method of a cold-rolled steel sheet according to claim 1, the method comprising:
   a hot rolling process of heating, a cast slab containing, as a chemical composition, by mass %, C: 0.180% or more and 0.350% or less, Mn: 2.00% or more and 4.00% or less, P: 0% or more and 0.100% or less, S: 0% or more and 0.010% or less, Al: 0% or more and 0.100% or less, N: 0% or more and 0.0100% or less, Si: 0% or more and 1.00% or less, Ti: 0% or more and 0.050% or less, Nb: 0% or more and 0.050% or less, V: 0% or more and 0.50% or less, Cu: 0% or more and 1.00% or less, Ni: 0% or more and 1.00% or less, Cr: 0% or more and 1.00% or less, Mo: 0% or more and 0.50% or less, B: 0% or more and 0.0100% or less, Ca: 0% or more and 0.010% or less, Mg: 0% or more and 0.0100% or less, REM: 0% or more and 0.0500% or less, Bi: 0% or more and 0.050% or less, and a remainder of Fe and impurities, or of not heating when a temperature of the cast slab is 1100° C. or more and performing hot rolling on the cast slab to obtain a hot-rolled steel sheet;
   a coiling process of cooling the hot-rolled steel sheet to a coiling temperature of 550° C. or lower and coiling the hot-rolled steel sheet at the coiling temperature;
   a cold rolling process of pickling the hot-rolled steel sheet and performing cold rolling on the hot-rolled steel sheet to obtain a cold-rolled steel sheet;
   an annealing process of heating the cold-rolled steel sheet after the cold rolling process to a soaking temperature of 820° C. or higher in a nitrogen-hydrogen mixed atmosphere having a dew point of −20° C. or higher and 20° C. or lower and containing 1.0 volume % or more and 20 volume % or less of hydrogen as an in-furnace atmosphere during heating so that an average heating rate from 700° C. to the soaking temperature is slower than 10.0° C./sec, and annealing the cold-rolled steel sheet at the soaking temperature for 30 seconds or longer and 200 seconds or shorter;
   a first cooling process of cooling the cold-rolled steel sheet after the annealing process to a temperature range of higher than 425° C. and lower than 600° C.;
   a holding process of allowing the cold-rolled steel sheet to stay in the temperature range of higher than 425° C. and lower than 600° C. for 200 seconds or longer and 750 seconds or shorter after the first cooling process;
   a second cooling process of cooling the cold-rolled steel sheet to a temperature of 50° C. or higher and 250° C. or lower after the holding process;
   a tempering process of tempering the cold-rolled steel sheet at a temperature of 200° C. or higher and 350° C. or lower for 1 second or longer after the second cooling process;
   a third cooling process of cooling the cold-rolled steel sheet to a temperature at which skin pass rolling is possible after the tempering process; and
   a skin pass process of performing skin pass rolling on the cold-rolled steel sheet after the third cooling process,
   wherein a temperature of the hot-rolled steel sheet is caused to reach 500° C. or lower within 10 hours from completion of the hot rolling process and before the cold rolling process.

14. The manufacturing method of a cold-rolled steel sheet according to claim 13, wherein the cast slab contains, as the chemical composition, by mass %, one or more of
   Si: 0.005% or more and 1.00% or less,
   Ti: 0.001% or more and 0.050% or less,
   Nb: 0.001% or more and 0.050% or less,
   V: 0.01% or more and 0.50% or less,
   Cu: 0.01% or more and 1.00% or less,
   Ni: 0.01% or more and 1.00% or less,
   Cr: 0.01% or more and 1.00% or less,
   Mo: 0.01% or more and 0.50% or less,
   B: 0.0001% or more and 0.0100% or less,
   Ca: 0.0001% or more and 0.010% or less,
   Mg: 0.0001% or more and 0.0100% or less,
   REM: 0.0005% or more and 0.0500% or less, and
   Bi: 0.0005% or more and 0.050% or less.

15. The manufacturing method of a cold-rolled steel sheet according to claim 14, wherein, in the holding process, the cold-rolled steel sheet is immersed in a plating bath in a state where a temperature of the cold-rolled steel sheet is higher than 425° C. and lower than 600° C. to form a hot-dip galvanized layer on a surface of the cold-rolled steel sheet.

16. The manufacturing method of a cold-rolled steel sheet according to claim 15, wherein an alloying treatment for alloying the hot-dip galvanized layer is performed in the holding process.

17. The manufacturing method of a cold-rolled steel sheet according to claim 13, wherein, in the holding process, the cold-rolled steel sheet is immersed in a plating bath in a state where a temperature of the cold-rolled steel sheet is higher than 425° C. and lower than 600° C. to form a hot-dip galvanized layer on a surface of the cold-rolled steel sheet.

18. The manufacturing method of a cold-rolled steel sheet according to claim 17, wherein an alloying treatment for alloying the hot-dip galvanized layer is performed in the holding process.

* * * * *